United States Patent
Matyjaszewski et al.

(10) Patent No.: US 7,049,373 B2
(45) Date of Patent: May 23, 2006

(54) PROCESS FOR PREPARATION OF GRAFT POLYMERS

(75) Inventors: Krzysztof Matyjaszewski, Pittsburgh, PA (US); Jean-Francois Lutz, Pittsburgh, PA (US); Hosei Shinoda, Ichihara (JP)

(73) Assignee: Carnegie Mellon University, Pittsburgh, PA (US)

( * ) Notice: Subject to any disclaimer, the term of this patent is extended or adjusted under 35 U.S.C. 154(b) by 487 days.

(21) Appl. No.: 10/034,908

(22) Filed: Dec. 21, 2001

(65) Prior Publication Data

US 2002/0183473 A1 Dec. 5, 2002

Related U.S. Application Data

(63) Continuation-in-part of application No. 09/369,157, filed on Aug. 6, 1999, now Pat. No. 6,541,580, and a continuation-in-part of application No. 09/534,827, filed on Mar. 23, 2000.

(60) Provisional application No. 60/257,738, filed on Dec. 22, 2000.

(51) Int. Cl.
  C08F 210/00 (2006.01)
  C08F 255/00 (2006.01)
  C08F 257/00 (2006.01)

(52) U.S. Cl. .................. 525/242; 525/244; 525/63; 525/64; 526/317.1; 526/318.3

(58) Field of Classification Search ............ 525/242, 525/244, 63, 64; 526/318.3, 317.1
See application file for complete search history.

(56) References Cited

U.S. PATENT DOCUMENTS

| | | | |
|---|---|---|---|
| 3,183,217 A | 5/1965 | Semiuk et al. | |
| 3,959,225 A | 5/1976 | Kuntz | |
| 4,007,165 A | 2/1977 | MacLeay et al. | |
| 4,374,751 A | 2/1983 | Dudgeon | |
| 4,728,706 A | 3/1988 | Farnham et al. | |
| 4,940,648 A | 7/1990 | Geiger | |
| 4,954,416 A | 9/1990 | Wright et al. | |
| 5,089,135 A | 2/1992 | Yoneyama et al. | |
| 5,169,914 A | 12/1992 | Kaszas et al. | |
| 5,312,871 A | 5/1994 | Mardare et al. | |
| 5,405,913 A | 4/1995 | Harwood et al. | |
| 5,451,647 A | 9/1995 | Faust et al. | |
| 5,470,928 A | 11/1995 | Harwood et al. | |
| 5,508,353 A * | 4/1996 | Liu et al. ............. | 525/250 |
| 5,510,307 A | 4/1996 | Narayanan et al. | |
| 5,763,548 A | 6/1998 | Matyjaszewski et al. | |
| 5,789,487 A | 8/1998 | Matyjaszewski et al. | |
| 5,807,937 A | 9/1998 | Matyjaszewski et al. | |
| 5,910,549 A | 6/1999 | Matyjaszewski et al. | |
| 5,945,491 A | 8/1999 | Matyjaszewski et al. | |
| 6,111,022 A | 8/2000 | Matyjaszewski et al. | |
| 6,121,371 A | 9/2000 | Matyjaszewski et al. | |
| 6,124,411 A | 9/2000 | Matyjaszewski et al. | |
| 6,162,882 A | 12/2000 | Matyjaszewski et al. | |
| 6,254,854 B1 * | 7/2001 | Edwards et al. ............. | 424/46 |
| 6,288,186 B1 | 9/2001 | Matyjaszewski et al. | |
| 6,407,187 B1 | 6/2002 | Matyjaszewski et al. | |
| 6,512,060 B1 | 1/2003 | Matyjaszewski et al. | |
| 6,538,091 B1 | 3/2003 | Matyjaszewski et al. | |
| 6,541,580 B1 | 4/2003 | Matyjaszewski et al. | |
| 6,624,262 B1 | 9/2003 | Matyjaszewski et al. | |
| 6,624,263 B1 | 9/2003 | Matyjaszewski et al. | |
| 6,627,314 B1 | 9/2003 | Matyjaszewski et al. | |
| 2004/0204556 A1 * | 10/2004 | Matyjaszewski et al. | 526/329.7 |

FOREIGN PATENT DOCUMENTS

| | | |
|---|---|---|
| EP | 0341012 | 11/1989 |
| EP | 0870809 | 10/1998 |
| WO | WO 98/01480 | 1/1998 |
| WO | WO 00/56795 | 9/2000 |

OTHER PUBLICATIONS

Simion Coca, Christina B. Jasieczik, Kathryn L. Beers and Krzysztof Matyjaszeski, "Polymerization of Acrylates by Atom Transfer Radical Polymerization. Homopolymerization of 2-Hydroxyethyl Acrylate", Journal of Polymer Science, 1998, pp. 1417-1424, vol. 36, Part A: Polymer Chemistry.

Seong Mu Jo et al., "Polyacrylonitrile with Low Polydispersities by Atom Transfer Radical Polymerization", Polymer Preprints, vol. 38(1) Apr. 1997, pp. 697-698.

(Continued)

Primary Examiner—Roberto Rabago
(74) Attorney, Agent, or Firm—Kirkpatrick & Lockhart Nicholson Graham LLP

(57) ABSTRACT

A polymerization process is provided for the preparation of graft (co)polymers. An embodiment of the polymerization process of the present invention comprises copolymerizing macromonomers with (co)monomers utilizing a macroinitiator to form a graft (co)polymer. A further embodiment of a polymerization process of the present invention comprises (co)polymerizing macromonomers and monomers with a graft copolymer macroinitiator to form a block-graft (co) polymer. Another embodiment of the process of the present invention comprises (co)polymerizing macromonomers and monomers with a compatible macroinitiator. The chemical and structural properties of the product graft (co)polymer may be controlled by use of a compatible macroinitiator and the functional group on the macromonomer which effect the relative rates of incorporation of the macromonomer and the monomer. Graft (co)polymers may be prepared with homogeneous or heterogeneous distribution of grafts. In a further embodiment of the present invention, a copolymer with well-defined branches or grafts with predetermined molecular weights and low polydispersities can be obtained by preparing macromonomers by a living or a living/controlled polymerization process.

34 Claims, 4 Drawing Sheets

OTHER PUBLICATIONS

Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699-700.

Takeichi et al., "Preparation of Porous Carbon Films by the Pyrolysis of Poly(Urethane-imide) Films and Their Pore Characteristics", Carbon, Feb. 2001, pp. 257-265, vol. 39, No. 2.

Timothy E. Pattern and Krzysztof Matyjaszewski, Atom Transfer Radical Polymerization and the Synthesis of Polymeric Materials, Advanced Materials 1998 10 No. 12, 901-915.

T.E. Patten et al., "Polymers with very Low Polydispersities from Atom Transfer Radical Polymerization", Science, vol. 272, pp. 866-868, May 10, 1996.

U. Schubert et al., "Design of Effective Systems for Controlled Radical Polymerization of Styrene: Application of 4,4'-Dimethyl and 5,5'-Dimethyl 2,2'-Bipyridine Copper(ii) Complexes", Macromol. Rapid Commun., vol. 20, No. 6, pp. 351-355, 1999.

Wang et al., "Living"/Controlled Radical Polymerization, Transition-Metal-Catalyzed Atom Transfer Radical Polymerization in the Presence of a Conventional Radical Initiator, Macromolecules, 1995, vol. 28, pp. 7572-7573.

Wang, J.-S.; Matyjaszewski, K., J. Am. Chem. Soc. 1995, 117, 5614-5615.

Xia J. and Matyjaszewski K.,"Controlled/ "Living" Radical Polymerization. Homogenous Reverse Atom Transfer Radical Polymerization Using AIBN as the Initiator," Macromolecules, 1997, pp. 7692-7696, vol. 30.

Gromada, J.; Matyjaszewski, K. Macromolecules 2001, 34, 7664-7671.

Jin-Shan Wang and Krzysztof Matyjaszewski, "Controlled/ "Living" Radical Polymerization. Atom Transfer Radical Polymerization in the Presence of Transition-Metal Complexes". Reprinted form the Journal of the American Chemical Society, 1995, vol. 117, No. 20 p. 5614-5615.

Jin-Shan Wang and Krzysztof Matjaszewski, "Controlled/ "Living" Radical Polymerization, Halogen Atom Transfer Radical Polymerization Promoted by a Cu(I)/Cu(II) Redox Process". Preprinted from Macromolecules, 1995, 28. Department of Chemistry, Carnegie Mellon University. Received May 2, 1995; Revised Manuscript Received Aug. 14, 1995, p. 7901-7910 .

Krzysztof Matyjaszewski, Mingli Wei, Jianhui Xia and Nancy E. McDermott, "Controlled/"Living" Radical Polymerization of Styrene and Methly Methacrylate Catalyzed by Iron Complexes1", Macromolecules, vol. 30, No. 26, 1997, p. 8161-8164.

Krzysztof Matyjaszewski, Simion Coca, Scott G. Gaynor, Mingli Wei and Brian E. Woodworth, "Zerovalent Metals in Controlled/"Living" Radical Polymerization", Macromolecules, 1997, pp. 7348-7350, vol. 30, No. 23.

Matyjaszewski, K.; Editor Controlled/Living Radical Polymerization. Progress in ATRP, NMP, and RAFT. In: ACS Symp. Ser., 2000; 768, 2000., Chapter 19 "Reverse Atom Transfer Radical Polymerization Using AIBN or BPO as Initiator" pp. 263-275.

Matyjaszewski, K.; Xia, J. Chem. Rev. 2001, 101, 2921-2990.

Mingli Wei, Jianhui Xia, Nancy E. McDermott and Krzysztof Matyjaszewski, "Atom Transfer Radical Polymerization of Styrene in the Presence of Iron Complexes", Polymer Preprints, 38(2), 231 (1997), Department of Chemistry, Carnegie Mellon University.

Qiu, J.; Matyjaszewski, K; Thouin, L.; Amatore, C. Macromol. Chem. Phys. 2000, 201, 1625-1631.

Queffelec, J.; Gaynor, S.G.; Matyjaszewski, K. Macromolecules 2000, 33, 8629-8639.

U.S. Appl. No. 10/269,556, filed Oct. 11, 2002.
U.S. Appl. No. 09/359,359, filed Jul. 23, 1999.
U.S. Appl. No. 09/534,827, filed Mar. 23, 2000.
U.S. Appl. No. 09/972,056, filed Oct. 5, 2001.
U.S. Appl. No. 10/118,519, filed Apr. 6, 2002.
U.S. Appl. No. 10/271,025, filed Oct. 15, 2002.
U.S. Appl. No. 10/289,545, filed Nov. 7, 2002.

Carter et al., "Polyimide Nanofoams From Phase-Separated Block Copolymers", Electrochemical Society Proceedings, 1997, pp. 32-43, vol. 97, No. 8, Electrochemical Society, Pennington, NJ, US,.

Chen et al., "Pryolytic Behavior and In-Situ Paramagnetism of Star-like C60(CH3)x(PAN)xcopolymers", European Polymer Journal, Mar. 1, 1998, pp. 421-429, vol. 34, No. 3-4, Elsevier Science Ltd., Oxford, GB.

Dorota Greszta et al., "Gradient Copolymers of Styrene and Acrylonitrille Via Atom Transfer Radical Polymerization", Polymer Preprints, Apr. 1997, pp. 709-710, vol. 38(1).

* cited by examiner

Homogeneously distributed branches

Polymer A

Heterogeneously distributed branches

Polymer B

Block copolymers $r_{MMA/PDLA} = 0,6$    *JFL023* Block by ATRP (first block PMMA/PDLA)    $r_{MMA/PDMS} = 2,7$ $r_{MMA/PDMS} = 1,3$    *JFL028* Block by ATRP (first block PMMA/PDMS)    $r_{MMA/PDLA} = 0,5$

US 7,049,373 B2

PROCESS FOR PREPARATION OF GRAFT POLYMERS

The present application is a continuation-in-part application claiming priority under 35 U.S.C. § 120 from U.S. applications Ser. No. 09/369,157 filed on Aug. 6, 1999, now U.S. Pat. No. 6,541,580 and Ser. No. 09/534,827 filed on Mar. 23, 2000 and also claiming priority under 35 U.S.C. § 119 from U.S. provisional application 60/257,738 filed on Dec. 22, 2000.

FIELD OF THE INVENTION

This invention is directed toward a process for the preparation of graft (co)polymers. Specifically, graft (co)polymers prepared by "grafting through" macromonomers with a macroinitiator. The disclosed process is applicable to any (co)polymerization process. Embodiments of the process of the present invention provides for the preparation of graft copolymers with a broad range of structures and compositions including, but not limited to, phase separable compositions and compositions with controlled distribution of the graft copolymers along the backbone polymer and graft copolymers comprising biologically compatible grafts or grafts comprising polyolefins. The invention also allows for preparation of block-graft copolymers wherein each block is a graft copolymer.

DESCRIPTION

The properties of graft (co)polymers are determined by many structural and chemical factors including, but not limited to, the chemical composition of the backbone of the (co)polymer, the chemical composition of the branch (co)polymers, the length of the backbone, the lengths of the branches, and the spacing of the branches along the backbone or the branch distribution. The "grafting through" polymerization process is considered potentially one of the most useful ways to design and obtain well-defined graft (co)polymers. The "grafting through" process for the preparation of graft (co)polymers comprises polymerizing macromonomers. The macromonomers may preferably be copolymerized with a lower molecular weight comonomer to prepare a graft (co)polymer. Schulz, G. O.; Milkovich, R. *J. Appl. Polym. Sci.* 1982, 27, 4773.

Graft (co)polymers have many commercially important applications. Many specific applications of graft (co)polymers benefit from the phase separation of the graft (co)polymer between the backbone of the (co)polymer and the grafts of the (co)polymer. This phase separation of the polymer often results from a difference in phylicities between the grafts and the backbone. However, the benefit derived from the phylicity differences in the graft copolymer can also create difficulty incorporating the macromonomers into polymer. Some of these difficulties may be attributed to the slow rate of diffusion of the polymerizable functional group on the macromonomer to the growing polymer chain end. However, phase separation due to the differences of phylicities of the components of the polymerization medium also contributes to the copolymerization processing problems. The phase separation is particularly significant in the preparation of high performance graft copolymers, such as organic/inorganic hybrid graft copolymers. These high performance polymers can comprise dramatically different characteristics in the backbone and in the branches. The effect of phase separation during polymerization may be reduced in some cases by using a compatible co-solvent for both the macromonomer and the copolymer. However, if the macromonomer and the copolymer segment are highly incompatible, the co-solvent may be not sufficient to decrease the incompatibility effect.

The polymerization medium of a radical polymerization process comprising macromonomers and monomers, for example, may undergo a phase separation early in the polymerization process as the backbone grows from the polymerization of the monomer, a high molecular weight copolymer is produced. The phylicity of this high molecular weight copolymer may be different than the phylicity of the macromonomer. This difference in phylicities may lead to a two phase polymerization process, one phase comprising a substantial portion of the growing polymer chain and the low molecular weight monomer and the other phase comprising a substantial portion of the macromonomer.

This phenomenon leads to a heterogenous distribution of grafts among the chains, some polymer having many grafts and some polymer having few grafts. The amount of grafts on a polymer depend on whether the polymer was formed early in the polymerization and later in the polymerization.

Prior art processes for the preparation of macromonomers have been limited primarily to ionic polymerization processes and this has limited the functionality that can be ultimately incorporated into polymers and thereby the control over factors effecting the properties of the graft copolymer. Attempts have been made to reduce the phase separation problem by addition of an appropriate solvent to the polymerization process but commercial processes are still severely limited in the range of compositions of the graft (co)polymers that can be prepared.

DESCRIPTION OF THE FIGURES

The features and advantages of embodiments of the present invention may be better understood by reference to the accompanying figures, in which.

DESCRIPTION OF THE EMBODIMENTS OF THE INVENTION

Figure 1:
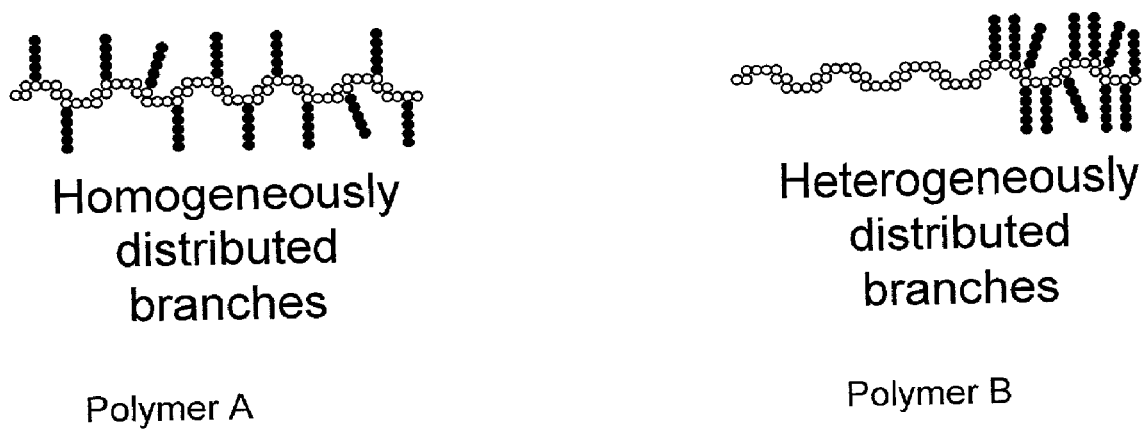
FIG. 1 is a graphical depiction of graft copolymers, Polymer A is an example of a graft copolymer having homogeneously distributed grafts and Polymer B is an example of a graft copolymer having a heterogeneous distribution of grafts.

The present invention provides a polymerization process for the preparation of graft (co)polymers by the grafting through process. An embodiment of the polymerization process of the present invention comprises copolymerizing macromonomers with (co)monomers utilizing a macroinitiator to form a graft (co)polymer. Another embodiment of a polymerization process of the present invention comprises (co)polymerizing macromonomers and monomers with a graft copolymer macroinitiator to form a block-graft (co) polymer. As used herein, a polymerization process is a system comprising the components necessary to conduct a any polymerization, such as for example, in an embodiment of a standard free radical or addition polymerization system the polymerization process comprises radically polymerizable monomers and a standard free radical initiator, or in an embodiment of a nitroxide mediated polymerization comprises an initiator, a stable free radical and radically polymerizable monomers, etc. Another embodiment of the process of the present invention comprises (co)polymerizing macromonomers and monomers with a compatible macroinitiator.

As used herein, a "macroinitiator" is an oligomer, polymer or other large molecule which is capable of initiating a polymerization process. A macroinitiator may comprise more than one polymerization initiation site. A "compatible macroinitiator" is a macroinitiator which is at least partially soluble or miscible in the macromonomer and does not undergo a phase separation. The compatible macroinitiator may be present in a system with mixtures of macromonomers or mixtures of macromonomers and other monomers. A compatible macroinitiator, if necessary, acts to compatibilize the macromonomer and at least one or a combination of the monomer, the initially produced polymer. The compatible macroinitiator may have the same segment structure as the macromonomer, or more preferably, a macroinitiator that has a different composition than the macromonomer but is soluble in macromonomer thereby using entropy as an additional driving force for compatibility between the polymerization components and the forming copolymer, all in solution in remaining (co)monomer(s). Improved reactivity for the macromonomer can be expected because the growing copolymer chain is a block copolymer comprising the (co) polymerization components and the first formed copolymer acts as a surfactant and retains compatibility with the macromonomer.

As used herein, "macromonomers" are oligomers, polymers or other large molecules comprising at least one functional group suitable for further (co)polymerization, preferably the functional group is a terminal functional group. One such terminal functional group is an unsaturated functional group suitable for free radical (co)polymerization. A "radically copolymerizable macromonomer" is a macromonomer which is capable of reacting in a radical polymerization process, preferably a radically polymerizable macromonomer comprises a terminal unsaturated functional group capable of reacting with a radical.

In addition, unless otherwise indicated, all numbers expressing quantities of concentrations, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

An embodiment of the process of the present invention comprises macromonomers and compatible macroinitiators in a controlled radical polymerization process for the preparation graft copolymers by "grafting through" polymerization. This embodiment allows incorporation of macromonomers into a growing backbone polymer and controlled growth of the backbone polymer. The chemical and structural properties of the product graft (co)polymer may be controlled by use of a compatible macroinitiator and the functional group on the macromonomer which effect the relative rates of incorporation of the macromonomer and the monomer.

In a further embodiment of the present invention, a copolymer with well-defined branches or grafts with predetermined molecular weights and low polydispersities can be obtained by preparing macromonomers by a living or a living/controlled polymerization process. The meaning of these terms are discussed in the following references: Szwarc, M. *Nature* 1956, 178, 1168–1169; Matyjaszewski, K. *J. Phys. Org. Chem.* 1995, 8, 197–207; Matyjaszewski, K.; Lin, C. H. *Makromol. Chem., Macromol. Symp.* 1991, 47, 221–237; Litvinenko, G.; Mueller, A. H. E. *Macromolecules* 1997, 30, 1253–1266; Matyjaszewski, K.; Mueller, A. H. E. *Polym. Prepr.* 1997, 38(1), 6–9 and Matyjaszewski, K. *J. Macromol. Sci., Pure Appl. Chem.* 1994, A31, 989–1000. In a preferred embodiment of the present invention the backbone is also polymerized with using a controlled polymerization process of the macromonomer and the low molecular weight comonomer with a macroinitiator thereby producing a backbone copolymer with a controlled molecular weight distribution. As used herein, "monomer" or "comonomer" is a molecule that is capable of conversion to polymers, synthetic resins or elastomers by combination with itself or other similar molecules or compounds. The term monomer, as used herein, is not limited to small molecules, but includes oligomers, polymers and other large molecules capable of combining with themselves or other similar molecules or compounds.

The reactivity ratio of the macromonomer with the comonomer has been used to measure incorporation of macromonomers into a graft (co)polymer. A reactivity ratio close to 1 indicates a more statistical incorporation of the macromonomer into the graft (co)polymer and would result in the preparation of a graft (co)polymer with a homogeneous distribution of grafts along the backbone (co)polymer. Reactivity ratios different than 1 indicate either a more rapid incorporation or a less rapid incorporation of the macromonomer or the comonomer and result in a more hetrogenous distribution of grafts along the backbone of the (co)polymer.

One embodiment of the process of the present invention, such as embodiments comprises copolymerizing a macromonomer with a vinyl-end group and a radically (co) polymerizable monomer in a controlled radical polymerization process, such as atom transfer radical polymerization ("ATRP"), is described in detail. This embodiment exemplifies the criteria for grafting through macromonomers into graft (co)polymers, not only for controlled radical polymerization processes but also for any other polymerization process, such as nitroxide mediated polymerization, ionic or cationic polymerization, RAFT processes and addition polymerization processes. Further embodiments of the process of the present invention include the preparation of hybrid graft (co)polymers with grafts or backbones comprising inorganic monomer units, grafts or backbones comprising biodegradable monomer units, grafts or backbones comprising polyolefin monomer units and the preparation of block (co)polymers wherein each block comprises a graft (co)polymer, and preferably each block comprises graft segments of different compositions. Also described are embodiments which can be utilized to prepare gradient-graft copolymers, gradient-graft-(co)macroinitiators and gradient-graft-(co) macromonomers. ATRP processes are disclosed in the commonly assigned U.S. Pat. Nos. 5,763,548; 5,807,937; 5,789,487; 5,945,491; 6,111,022; 6,121,371; 6,124,411; 6,162,882; and U.S. application Ser. No. 09/034,187, now U.S. Pat. No. 6,407,187; Ser. No. 09/018,554, now U.S. Pat. No. 6,538,091; Ser. No. 09/431,871, now U.S. Pat. No. 6,162,882; Ser. No. 09/359,359, now abandoned; Ser. No. 09/359,591, now U.S. Pat. No. 6,512,060; Ser. No. 09/369,157, now U.S. Pat. No. 6,541,580; Ser. Nos. 09/534,827; 09/972,046, now U.S. Pat. No. 6,627,314; Ser. Nos. 09/872,056; and 09/972,260, now U.S. Pat. No. 6,642,262, all of which are herein incorporated by reference.

Embodiments of the process of the present invention may also be used for the preparation of well-defined homogeneous graft (co)polymers, biphasic graft copolymers and triphasic graft copolymers. A biphasic copolymer is a polymer which contains segments which form into two separate phases either alone or in at least one solvent, such as, for example, a segment soluble in an organic phase and a segment soluble in an aqueous phase. A triphasic copolymer is a polymer which contains segments which form into three separate phases either alone or in at least one solvent, such as, for example, a segment soluble in an organic phase, a segment soluble in an aqueous phase and a crystalline phase or a low Tg segment, a high Tg segment and a crystalline phase.

The properties of graft (co)polymers are determined by many structural and chemical factors including, but not limited to, the chemical composition of the backbone of the (co)polymer, the chemical composition of the branch (co)polymers, the length of the backbone, the lengths of the branches, and spacing of the branches along the backbone or the branch distribution. The average spacing of the side chains, and the overall (co)polymer composition, will be determined by the molar ratio of macromonomer to comonomer in the feed, their reactivity ratios and the ratio of comonomers incorporated into graft copolymer. For example, in FIG. 1, both Polymer A and Polymer B have the similar backbone lengths, similar branch lengths, and the similar number of branches, but clearly a different branch spacing distribution. Polymer A has homogeneously distributed branch spacing, while polymer B has heterogeneously distributed branch spacing structures. As used herein, homogeneously distributed branch spacing" means that the branches are distributed generally evenly throughout the backbone. In a "heterogeneously distributed branch spacing," the (co)polymer has regions with higher concentrations of branches. The process of the present invention may be used to control the spacing distribution of the branches or grafts along the polymer backbone with the modification of the components or parameters of the polymerization, such as, but not limited to, selection of the macroinitiator, the reactive functional group on the macromonomer, polymerizing a mixture of macromonomers or monomers and by changing the order of (co)polymerization in the formation of block-graft copolymers.

The spacing distribution is influenced by the relative reactivity ratios and the concentration of the macromonomer and the low molecular weight comonomer. The reactivity ratios are influenced by many complicated factors, but are mainly affected by:

1) the diffusion control effect, or the kinetic excluded volume effect, associated with the large size of a macromonomer;
2) the inherent reactivity of the terminal functionality on the macromonomer and the comonomer based on their chemical structure; and
3) the incompatibility effect potentially due to the thermodynamic repulsive interactions between a macromonomer and a propagating polymer chain.

The incompatibility effect is particularly important when preparing graft copolymers displaying micro-phase separation in the formed copolymer due to the chemical and structural differences between the macromonomer and the monomer.

The diffusion control effect was studied by Radke, W.; Müller, A. H. E. *Makromol. Chem., Macromol. Symp.* 1992, 54/55, 583. The copolymerization of a methyl methacrylate macromonomer with a methacrylate functional end group with methyl methacrylate was examined. In this case, due to the similarity in chemical structure of the macromonomer and monomer, factors 2) and 3) described above can be ignored. The reactivity ratio for methyl methacrylate, in such a copolymerization, using a conventional small molecule free radical initiator in a standard free radical polymerization process was determined to be between 1.12 and 2.14. They found that an increase in the macromonomer concentration would result in a reduction of the relative reactivity of the macromonomer. The increase in macromonomer increased the viscosity of the reaction medium and hence lowered the rate of diffusion of the functional end group on the macromonomer to the growing polymer chain end. This result indicates that the diffusion effect cannot be ignored in grafting through polymerization processes.

This phenomenon is exacerbated in the case of macromonomer copolymerization when there is a difference in compatibility between the macromonomer and backbone copolymer as described in factor 3. The incompatibility may be influenced by differences in phylicity of the polymerization components, for example. In such a process, as the backbone polymer is formed the resulting solution of the backbone polymer and macromonomer in unreacted monomer, and optionally added solvent, may phase separate. In the phase separated polymerization medium, the reactivity of the macromonomer is significantly reduced and uncontrolled polymerizations may occur. Therefore, graft copolymers with heterogeneously distributed compositions along the copolymer chains are formed and the process does not produce well-defined copolymers. For certain specific applications, well-defined copolymers are desired.

The chemical composition of the branches and backbone of the graft (co)polymers are determined by the chemical composition of the initiator, the macromonomer and the monomer used in the process. Macromonomers and macroinitiators for use in the present invention may be prepared by any chemical process. Preferably, macromonomers may be prepared by controlled or living polymerization processes. Macromonomers may be prepared by controlled radical polymerization processes, such as ATRP utilizing a functional initiator. Therefore, the micro- and macro-functionality may be incorporated into graft (co)polymers prepared by embodiments of the processes of the present invention.

A polymer or oligomer comprising a radically transferable atom or group prepared by ATRP, may be further used as a macroinitiator in an embodiment of the process of the present invention. Optionally, a polymer or oligomer comprising a polymerizable functional group and a radically transferable atom or group may be prepared by ATRP. The radically transferable atom or group may then be transformed into a non-reactive, non-transferable group before the polymer is further polymerized by a process of the present invention as a macromonomer. A general method for this process of preparing one such macromonomer is exemplified in Scheme 1. In the specific examples detailed in the experimental section a hydroxy functionalized initiator was used to polymerize n-butyl acrylate and t-butyl acrylate (polymerization of many other monomers have been described elsewhere). The halogen end group was then removed using tributyltin hydride and AIBN. The hydroxyl end group was then esterified with methacryloyl chloride to provide the polymerizable double bond.

segment of the block-macromonomer. The block macromonomers may be (co)polymerized by any polymerization process, such as, but not limited to, ATRP, ionic polymerization, standard free radical copolymerization or any other standard or controlled polymerization process incorporating a macroinitiator.

During the synthesis of macromonomers by ATRP for further polymerization by an embodiment of the process of the present invention comprising ATRP, the radically transferable end functionality on the first formed (co)polymer should, preferably, be substantially removed to avoid the formation of a bifunctional macromonomer, if this is not desired. More preferably, the radically transferable atom or group should be almost completely removed if one desires to form bottle brush polymers or fully controlled graft copolymers. Otherwise, the presence of such a bi-functional

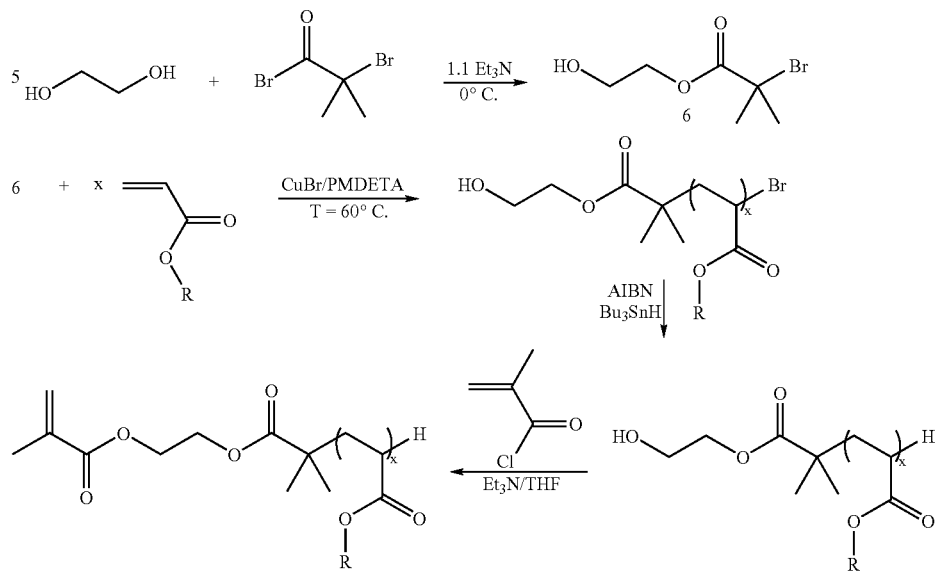

Scheme 1

The reactions of Scheme 1 may be employed to provide at least three useful categories of functional materials applicable to the present invention. These include a macroinitiator, a macromonomer, and a bi-functional macro-AB*-monomer.

Prior to removal of the halogen, the first formed polymer comprises a hydroxy group and a radically transferable end group. This first formed polymer is an active macroinitiator that can be utilized for initiation of the copolymerization of macromonomers by ATRP or can be employed for further polymerization to form block copolymers which may be used as block co-macroinitiators. The block copolymers may then be converted into block-macromonomers by removal of the halogen, by the method of Scheme 1 or any other method, and esterification of the hydroxy-group remaining available on the initiator residue, using any known chemistry, such as, the procedures described below or the method described in Scheme 1.

The resulting block-macromonomers may be incorporated in a polymerization process of the present invention initiated with a macroinitiator compatible with at least one macromonomer may lead to the formation of (hyper) branched polymers during subsequent ATRP (co)polymerization. However, if desired, such materials prepared from a bi-functional macromonomer as a comonomer in a process of the present invention would be expected to produce useful materials, since the degree of branching in the final copolymer can be controlled by the molar ratio of functionality on the AB* macromonomer. For Example, such branched copolymers are known to have useful rheological properties.

In Scheme 1, a process for the conversion of the terminal bromo-atom into hydrogen using $Bu_3SnH$ is shown. However, since tin hydride and the resulting tin bromide, may cause side reactions, such as termination or chain transfer, during the subsequent polymerization it should be at least substantially removed from the macromonomer prior to further polymerization. The macromonomer may be filtered through an absorbing media to remove the tin hydride and tin bromide. Other routes for bromine removal that avoid the problem of metal contamination or potential catalyst interactions are shown in Scheme 2.

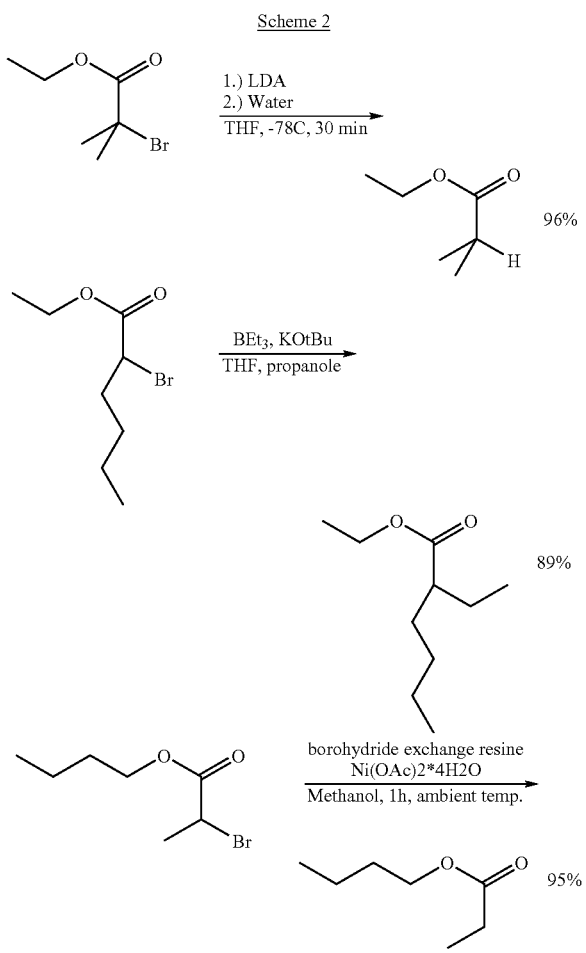

Scheme 2

In the first reaction shown in Scheme 2, the desired product is obtained in high yield and the co-products, the lithium salt and diisoproylamine may be easily and effectively removed from the macromonomer. This reaction may also performed to remove bromine from more sterically hindered α-bromides.

Several inferences can be drawn from the embodiments disclosed herein comprising the ATRP of macromonomers that can be applied to other polymerization systems. These inferences apply to the application of the process of the present invention to other polymerization systems. First, while the rate of exchange and concentration of radicals remains the same in the controlled radical polymerization of macromonomers, the rate of polymerization is expected to be slow relative to copolymerization of small monomers using the same conditions.

In order to fully understand published conditions for ATRP and adapt them for copolymerization of macromonomers, embodiments of the process of the present invention were modeled using a simulation program, Predici. A conventional ATRP polymerization process was modeled including using one equivalent of a homogeneous copper-based catalyst complexed with a soluble bipyridine ligand, relative to a small molecule initiator, such as, ethyl 2-bromoisobutyrate. The kinetic data used to determine $k_p$, the polymerization rate constant; and $k_t$, the termination rate constant in the literature for Controlled Free Radical Polymerization (CFRP) was modeled. Subsequently, kinetic parameters were generated which identified conditions under which polymerization of a macromonomer could be controlled. The principles derived from this model were then extended to a model of an embodiment of the present invention comprising ATRP. The data generated from the Predici model was able to approximate the experimental data obtained for the copolymerization of a polystyrene macromonomer with a methacrylate end group with $M_n$=4400. Using the initially proposed conditions the rate of propagation was slow. The rate of polymerization may be increase by using multiple equivalents of catalyst, as high as 10:1, to drive the polymerization forward. However, since $k_d$, the deactivation rate of the radical formed from the initiator, or growing polymer chain end, remains constant this would lead to a substantial decrease in initiation efficiency of a small molecule alkyl halide. We thought that this limitation could be avoided by using a macroinitiator such as those used to prepare block copolymers, thereby decreasing $k_d$, the deactivation rate constant, commensurately with $k_t$. Finally, to limit the overall use of catalyst, a catalyst system with substantially higher $k_a$ and/or lower $k_d$ was implemented such that the radical concentration remains high under more 'catalytic' conditions.

With this fundamental understanding of the kinetic requirements for the incorporation of macromonomers into fully controlled ATRP polymerizations it was now possible to attest this insight and incorporate macromonomers prepared by any polymerization processes, preferably controlled polymerization processes, into the backbone of a free radically (co)polymerized polymer.

A series of radical copolymerization reactions were conducted with macromonomers and methyl methacrylate. This copolymerization process was chosen to allow direct comparison with the work of Radke and Mueller and exemplify without limiting the process of the present invention. In these embodiments, the backbone may comprise any free radically polymerizable (co)monomers and one only need consider the reactivity of the terminal functionality with the selected comonomers and composition of the macromonomer to attain similar results in different polymerization processes. Indeed such consideration is amplified in the discussion describing a process for the preparation of a graft (co)polymer with a homogeneous distribution of grafts. The preferred embodiment of the present invention comprises the atom transfer radical copolymerization of a compatible macroinitiator with a macromonomer. This approach led to enhanced incorporation of the macromonomer into the controllably, growing backbone polymer. In other radical polymerization processes where the rate of propagation for backbone copolymerization is faster, and less controlled than ATRP, there was a less pronounced, but still significant positive effect seen by use of a macroinitiator instead of a small molecule initiator. The other radical polymerization systems evaluated were RAFT, redox initiated polymerization, and conventional radical polymerization.

Embodiments of the process of the present invention described in the examples include the copolymerization of polydimethylsiloxane macromonomers with incompatible monomers forming an incompatible backbone to form graft copolymers to form graft copolymers. In the specific example provided of the (co)polymerization of polydimethylsiloxane, the macromonomer and macroinitiator were prepared by a non-radical polymerization process. The copolymer selected to exemplify this approach comprised poly (methyl methacrylate) for the organic backbone polymer and poly(dimethylsiloxane) for the inorganic branches. Such organic/inorganic hybrid graft copolymers are of interest because polymers comprising inorganic substituents generally have unique and specific properties that organic analogues do not possess. Such hybrid graft copolymers exhibit good micro-phase separation and find use in a variety of applications, such as impact-resistant plastics, thermoplastic elastomers, compatibilizers and polymeric emulsifiers. Additionally, branched polymers comprising inorganic subsituents generally show decreased melt viscosities which provides important advantages, especially for processing. Since the graft copolymers disclosed have many structural factors that can be varied (composition, backbone length, branch length, branch spacing, branch distribution, etc.), the process of the present invention has great potential to realize materials with new properties with high performance in specific applications.

A further example of the use of the process of the present invention is provided by the description of the preparation of a novel low viscosity graft copolymer with a backbone comprising a controlled molecular weight distribution and either heterogeneously or homogeneously distributed graft macromonomers prepared with biologically compatible and biologically degradable monomers. This example provides direction on the importance of the inherent reactivity of the end group and how end group reactivity can be manipulated in a controlled radical polymerization process to provide a graft copolymer with a narrow molecular weight distribution and selected distribution of grafts along a backbone chain. The graft copolymers prepared with biologically compatible grafts additionally exemplifies a process for development of bulk physical properties. The graft copolymer prepared by a process of the present invention comprises grafts that are soluble in the backbone copolymer at elevated temperature and additionally exemplifies a graft copolymer wherein the grafts comprise segments that can under certain circumstances crystallize thereby providing a phase separated bulk material while converting to a homogeneous material above the $T_m$ of the crystallizing phase. While the specific examples describe the preparation of a backbone polymer with a moderately high $T_g$ the procedure can be applied to copolymerization with monomers that provide polymers with low $T_g$ matrices (i.e. below room temperature) and thereby can act as elastomers or impact resistant resins.

A further example of the level of macromolecular architectural control attainable from the process of the present invention is the preparation of block copolymers in which one or more of the blocks comprise a graft copolymer. The preparation of an AB and an ABC block-graft copolymers are described for specific examples but the approach can be applied to the preparation of block copolymers of any topology. The distribution of the graft segments in the backbone copolymer can be significantly modified by the order of formation of each graft-block copolymer segment. When such block copolymers, additionally comprising graft segments of differing composition, are to be prepared it is possible to select the composition of each graft, and the backbone so that the resulting copolymer can be homogeneous, or can phase separate in a bulk copolymer into two or three discrete phases. In the specific example provided in the experimental section the PDMS phase may phase separate due to the difference in phylicity between the graft and the backbone, and the PLLA, or a derivative of PLLA, can phase separate as a result of crystallization from the matrix, if the appropriate matrix composition is selected. The resulting triphasic morphology of a block-graft copolymer can be transitory, and dependent on the conditions employed for fabrication of the material, however once the desired morphology is obtained it can be stabilized by incorporation and reaction of additional reactive functionality on the grafts or backbone that allows crosslinking reactions to occur either within the copolymer or with added materials. Examples of such functionality have been described in earlier applications incorporated by reference but include glycidyl-functionality or silyl-functionality, the latter of which can be crosslinked by exposure to moisture. The crosslinkable functionality can be incorporated into one or more of the macromonomers or into the backbone during copolymerization or by transformation of a functional group on the copolymer after preparation of the material. The site of the reactive functionality would impact the bulk properties of the formed resin while stabilizing the morphology.

Triphasic copolymers may also be prepared by the process of the present invention by preparation of copolymers with more than one macromonomer or by formation of gradient copolymers with more than one macromonomer.

Within the examples, specific conditions are provided for the copolymerization of macromonomers comprising an inorganic macromonomer, a biocompatible macromonomer, a polyolefin based macromonomer and the copolymerization of macromonomers of differing reactivity and macromonomers of differing composition. A biocompatible material is a material which is biologically compatible by not producing a toxic, injurious, or immunological response in living tissue or other undesirable effect. The types of macromonomers employed in the examples should not be considered as a limitation on the applicability of the process described, since the improved incorporation of macromonomers by use of a compatible macroinitiator can be applied to any polymerization process and can encompass macromonomers comprising any polymerizable monomer unit.

The process of the present invention allows preparation of well-defined graft (co)polymers with either homogenously or heterogenously distributed branches. The distribution of the branches is primarily controlled by the relative reactivity ratio of the macromonomer and the monomer and the compatibilizing effect of the macroinitiator.

Copolymerizations of poly(dimethylsiloxane)-macromonomer and methyl methacrylate were performed in four different systems: a standard radical polymerization with a low molecular weight initiator and with a macroinitiator and an ATRP with a low molecular weight initiator and with a macroinitiator. To further highlight the beneficial effect of the use of a macroinitiator in other radical polymerizations processes, redox initiated polymerizations were also performed with a low molecular weight initiator and with a macroinitiator. The relative reactivity of the macromonomer in the copolymerization was compared for each polymerization.

In the example of a redox initiated polymerization, the copolymerization of methyl methacrylate and poly(dimethylsiloxane) macromonomer using a polydimethyl siloxane macroinitiator was conducted with a similar catalyst system to that employed for ATRP. The examples clearly indicate that a compatible macroinitiator increases the rate of incorporation of the macromonomer into the copolymer. The reactivity ratio of the macromonomer in the presence of a macroinitiator was 0.53. This can be compared to slower incorporation of the macromonomer, as measured by a reactivity ratio of 0.39 for the macromonomer, when no macroinitiator was employed. The reactivity ratio of this polymerization process is a little higher than that of the prior art conventional radical polymerization process. Polydispersity of the obtained copolymer was high (>2.7). However, even in this example the beneficial effect of the macroinitiator is clearly seen in spite of the fact that the propagation rate is high and the effect of diffusion on the macromonomer can't be ignored.

The results of the experiments, detailed in the examples, indicate that in a controlled polymerization process the incorporation of the macromonomer into the polymer was greatly improved, viz. the higher reactivity ratio of macromonomer ($1/r_1=0.85$) the controlled nature of the polymerization process significantly reduces, the effects of diffusion on the reactive macromonomer chain end.

Furthermore, use of a compatible macroinitiator can accelerate the incorporation of a macromonomer into the copolymer in the case of less controlled radical polymerizations in addition to fully controlled radical polymerization processes. The beneficial effect of the use of a compatible macroinitiator was most obvious when the polymerization was done at higher macromonomer concentration because the low molecular weight growing copolymer chain and macromonomer remain compatible.

As a further embodiment of the process of the present invention, conditions for incorporation of grafts comprising monomers from renewable natural sources into controlled polymerization processes have been disclosed. Such materials are of particular interest in the field of biologically interactive materials. In a non-limiting example, poly(m-ethyl methacrylate)-g-poly(lactic acid) graft copolymers were prepared by the process of the present invention. Specifically, ATRP of methyl methacrylate and poly(lactic acid)-macromonomers are discussed. Graft copolymers with heterogeneous distribution of grafts with a gradient of grafted chains close to the chain end comprising the initiator residue can be prepared or graft copolymers with heterogeneous distribution of grafts with a gradient of grafted chains close to the chain end comprising the growing polymer chain can be prepared or graft copolymers with a homogeneous distribution of grafts can be obtained when the functional end groups on the poly(lactic acid) macromonomers are selected to have an average reactivity ratio close 1.0. In the examples described below, for the preparation of a graft copolymer comprising a homogenous distribution of grafts the reactive end groups comprise an equimolar concentration of both methacryloyl and acryloyl functionality. Other functional end groups can be selected to allow similar "homogeneous" incorporation into backbone copolymers when different low molecular weight monomer units form the backbone copolymer or can be selected to afford the desired gradient heterogeneous distribution of grafts in a graft copolymer. The process of the present invention therefore comprises polymerizing a mixture of macromonomers, comprising different reactive end groups to control the rate of incorporation of the macronomomers into the graft (co) polymer.

The process for this control of incorporating macromonomers comprising different reactive end groups is exemplified by formation of a poly(lactic acid) graft copolymer. Poly (lactic acid) is a biodegradable aliphatic polyester derived from renewable resources and shows interesting properties: Vert, M.; Schwarch, G.; Coudane, J. *J. Macromol. Sci., Pure Appl. Chem.* 1995, A32, 787–796; and Lipinsky, E. S.; Sinclair, R. G. *Chem. Eng. Prog.* 1986, 82, 26–32. It has been investigated as a biomaterial for controlled drug delivery, Jackanicz, T. M.; Nash, H. K.; Wise, D. L.; Gregory, J. B. *Contraception* 1973, 8, 227; and Makino, K.; Arakawa, M.; Kondo, T. *Chem. Pharm. Bull* 1985, 33, 1195; as a material for bioabsorbable sutures or fibers, Pennings, J. P.; Dijkstra, H.; Pennings, A. J. *Polymer* 1993, 34, 942; and as substrates for implants for bone fixation, Leenslag, J. W.; Pennings, A. J.; Boss, R. R. M.; Rozema, F. R.; Boering, G. *Biomaterials* 1987, 8, 70; etc. Recently, as the production cost has been reduced because of technological breakthroughs, poly(lactic acid) is proving to be a viable alternative to petrochemical based plastics. Since graft copolymers are known to exhibit excellent properties, and have possibilities for a variety of applications, such as compatibilizers, emulsifiers, thermoplastic elastomers, or impact-resistant plastics, the study of precise structural control of graft copolymers containing poly(lactic acid) branches is of significant interest. One application for graft copolymers comprising such degradable graft segments would be in the preparation of porous membranes. The concentration of the grafted degradable polymer is selected so that the bulk graft-copolymer phase separated into a continuous bi-phasic morphology and then the degradable segment is removed allowing thereby forming a porous membrane.

Atom transfer radical copolymerization of methyl methacrylate and methacrylate-terminated poly(L-lactic acid) macromonomer (M-PLLA), methacrylate-terminated poly (D,L-lactic acid) macromonomer (M-PDLLA), and acrylate-terminated poly(L-lactic acid) macromoner (A-PLLA) was investigated and is herein disclosed as one example of the present invention. The relative reactivity of the methacrylate-terminated macromonomer ($1/r_{MMA}=1.75$) and the acrylate-terminated macromonomer ($1/r_{MMA}=0.61$) were close to that of the small molecule models of the macromonomer end groups; 2-hydroxyethyl methacrylate and 2-hydroxyethyl acrylate, respectively and their individual copolymerization formed graft copolymers with a heterogeneous distribution of graft chains along the polymer backbone; one preferentially incorporated early in the polymerization and one incorporated later. This understanding allowed us to copolymerize a mixture of a methacrylate-terminated macromonomer and an acrylate-terminated macromonomer with methyl methacrylate by ATRP to give substantially homogeneously branched poly(methyl methacrylate)-g-poly(lactic acid) graft copolymer with low polydispersity (Mw/Mn=1.15) indicating a fully controlled copolymerization.

The poly(L-lactic acid) macromonomers containing either a methacryloyl end group, or an acryloyl end group, were prepared by the ring opening polymerization of L-lactide using a tin catalyst, and using 2-hydroxyethyl methacrylate or 2-hydroxymethyl acrylate as the initiator, Scheme 3 shows the use of 2-hydroxyethyl methacrylate.

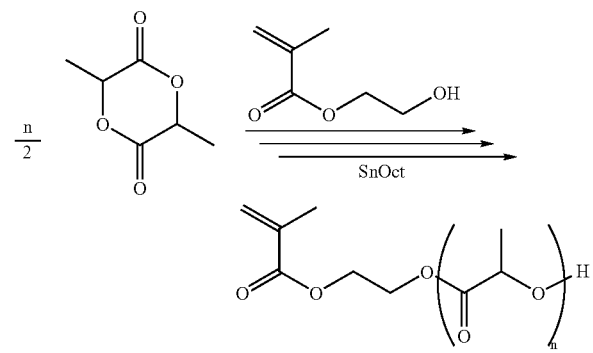

Scheme 3

Highly functionalized, low polydispersity poly(L-lactic acid) macromonomers were obtained in both cases.

Although the molecular weight from GPC was higher than the value from NMR, it is consistent with our experience (Mn from GPC is about 1.5 times higher than actual molecular weight). The macromonomers were obtained as white powders, soluble in chloroform, THF, hot toluene, or hot xylene.

The ATRP copolymerization of poly(L-lactic acid) macromonomer with a methacrylate end group and methyl methacrylate was performed at 90° C. The composition of poly(L-lactic acid) macromonomer in feed was 3.5 mol %, or 50 wt %. The target degree of polymerization was 300. A homogeneous polymerization was conducted in the presence of a mixed diphenyl ether/xylene solvent and the poly(L-lactic acid) macromonomer was efficiently incorporated into the copolymer. The resulting reactivity ratio of methyl methacrylate ($r_{MMA}$) was calculated to be 0.58. This indicates a gradient copolymer was formed with preferential incorporation of the grafts closer to the terminus of the backbone containing the attached initiator residue.

Use of an acrylate functionality on the poly(L-lactic acid) macromonomer gave a copolymer in which the resulting reactivity ratio of methyl methacrylate ($r_{MMA}$) was calculated to be 1.63. This again indicates the copolymer has a heterogeneous distribution of grafts or branches and that a gradient copolymer was formed, in this case with preferential incorporation of the grafts closer to the terminus of the backbone containing the radically transferable atom; i.e. the opposite of the first gradient copolymer prepared with the methacrylate end group. This led to the understanding that copolymerization of both macromonomers with methyl methacrylate can provide for the preparation of a graft copolymer with homogeneous distribution of grafts along the backbone chain and provide for a backbone chain comprising a narrow molecular weight distribution.

Furthermore, use of the appropriate functionality on the poly(L-lactic acid) macromonomer can allow preparation of an elastomeric material; one with an acrylate backbone, that comprises the matrix, and a crystallizable graft, that is further susceptible to biological degradation during recycle processes. In the specific case described in the examples the acrylate selected for the exemplary backbone copolymer is butyl acrylate. This interesting graft copolymer has a soft segment backbone and biodegradable hard segments, which have the ability to undergo phase separation and aggregation through crystallization. Such a graft copolymer may be useful as a biodegradable thermoplastic elastomeric material.

The graft copolymers prepared above are examples of the type of materials that can be prepared by an embodiment of the present invention by a controlled radical polymerization process such as, but not limited to, ATRP, NMP or RAFT copolymerization, of a macromonomer with radically (co)polymerizable monomer(s).

A further extension of this control over the composition of graft copolymers is the copolymerization of at least two macromonomers with different compositions with one or more low molecular weight monomers. The result of such a copolymerization would be a graft copolymer with grafted polymer chains comprising two different compositions attached to the same backbone (co)polymer. In the examples below, gradient-graft-copolymers were prepared by the process of the present invention wherein the distribution of each macromonomer along the backbone copolymer was heterogeneous, however, by applying the principles discussed above the graft distribution of each macromonomer can be changed. The composition of the components of such a material can be selected to allow phase separation into a constrained bi-phasic or tri-phasic structure.

In a further series of embodiments of the present invention graft copolymers were used as macroinitiators for the (co)polymerization of macromonomers. Block-graft-copolymers were prepared wherein each block comprises a graft copolymer. This approach to material synthesis can also lead to constrained bi-phasic or tri-phasic structures in the resulting bulk copolymer. This series of experiments were conducted first to further exemplify the range of materials capable of being prepared by this technology, and further to provide materials for the examination of properties of such potential tri-phasic systems. In the examples below the preparation of an AB and an essential ABC block-graft copolymer are described. The physical properties or the morphologies of such tri-phasic graft copolymeric materials have not yet been explored but one would expect, if appropriately selected, for them to act in concert. In one exemplary case, one phase may act as a toughening agent while another provided channels of selective permeability in an article or film. A potential application for the exemplary material prepared below in the examples would be for one graft, for example, a PLLA macromonomer based graft, to provide biocompatibility, or selective permeability and for another graft, for example a PDMS graft, to provide increased toughness. Appropriate selection of the graft segments could also provide for a toughened matrix material with cylindrical or gyroidal channels for proton transfer.

A further series of examples builds on this recognition that the end group reactivity has to be considered when constructing graft copolymers. The copolymerization of (meth)acrylate terminated polyethylene macromonomers and (meth)acrylates and (meth)acrylate terminated polypropylene macromonomers providing graft copolymers with polyolefin grafts is described. Such graft copolymers can act as surfactants in stabilizing blends of polymers found in municipal recycle streams providing for improved "polymeric wood" formed by melt blending such streams.

Two approaches were evaluated for the preparation of polypropylene macroinitiators starting with polypropylene macromonomers comprising a terminal vinyl group. In the first route the polypropylene was functionalized using chlorodimethylsilane. This first route to the polypropylene-based macroinitiator is presented in Scheme 4.

Scheme 4: First route for the synthesis of polyproplene-based macroinitiator.

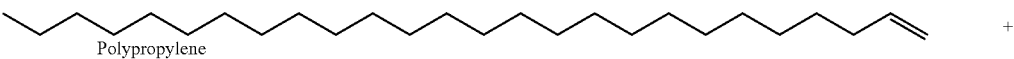

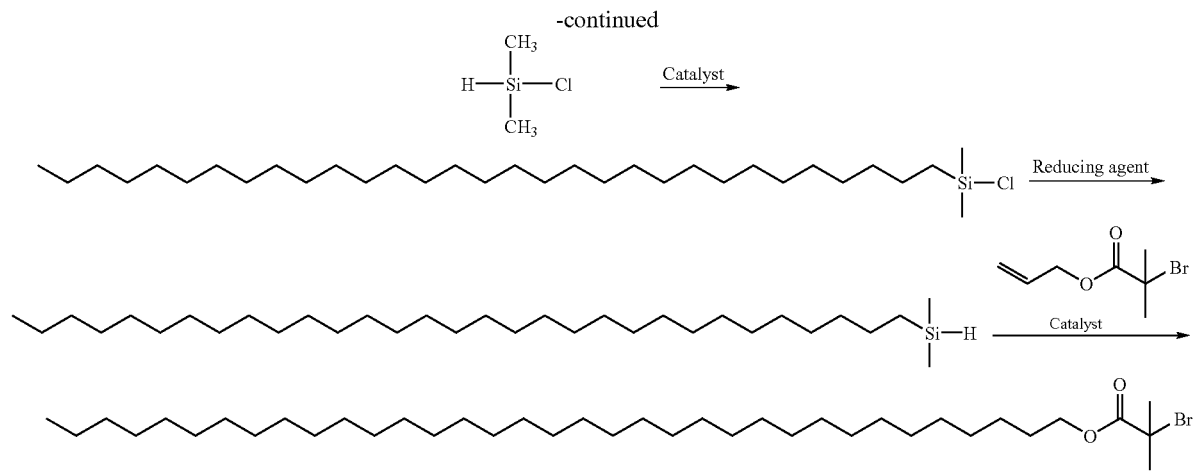

Within this reaction scheme there is an extra step, the synthesis of allyl-2-bromoisobutyrate. The reaction scheme for this step is presented in Scheme 5.

Scheme 5: Synthesis of allyl-2-bromoisobutyrate.

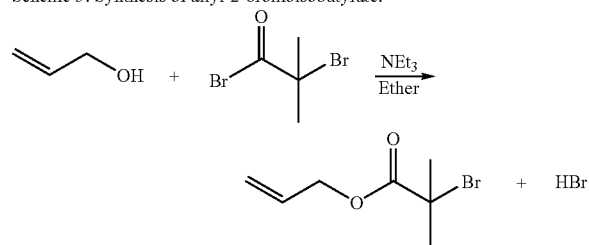

A second route started with the functional initiator prepared by the first reaction in Scheme 4 and used tetramethyldisiloxane to form a linking species. The second route is presented in Scheme 6.

This route permits one to avoid the reduction step. By avoiding the reduction step, the coupling reaction with the unsaturated polypropylene is the final step, thus reducing the number of steps involving the latter species from three to one. The major drawback of the reaction in Scheme 6 is that it leads to a polymer with a siloxane bond, which is not the case of the route described in Schemes 4 and 5 using chlorodimethylsilane. Consequently, copolymers prepared from the macroinitiator prepared according to Scheme 6 have a lower stability toward strong acids and bases.

A variation on this second route for the preparation of the polypropylene macroinitiator was also evaluated. Platinum complexes can catalyze the formation of a Si—Si bond during hydrosilation reactions; Brown-Wesley, K. "Formation of Si—Si Bonds in the Presence of Hydrosilation Catalysts" *Organometallics* 1987, 6, 1590. This formation is due to a possible bimolecular reaction between two silane entities, leading to a disilicon compound and to the formation of $H_2$. This proportion of products formed by such a side reaction may increase with the concentration of silane in the reaction medium, as well as with the temperature of the Scheme 6: Second route for the synthesis of polypropylene-based macroinitiator.

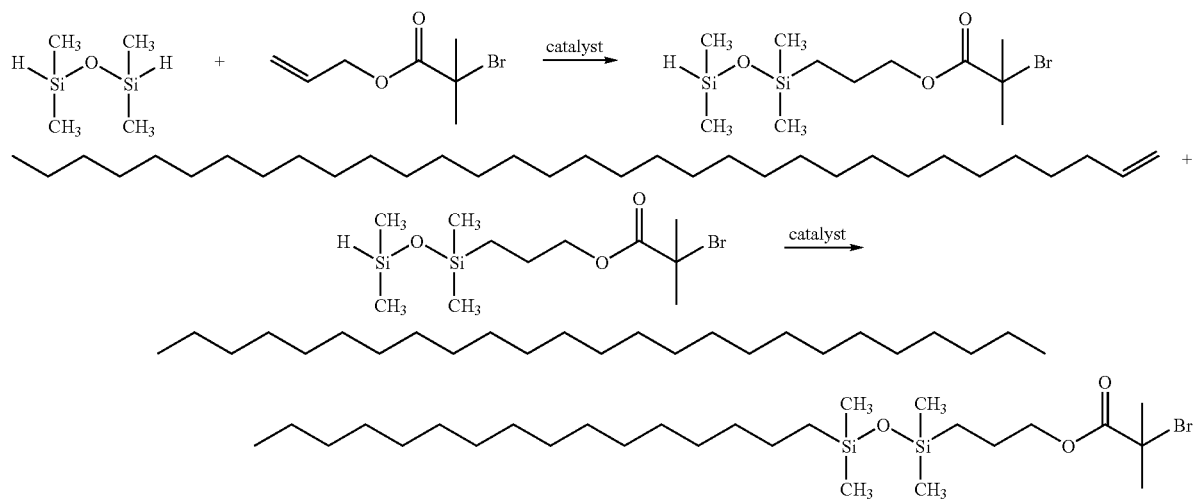

reaction; Britcherm L. G., Kehoe, D. C.; Matisons, J. G., Swinser, A. G. "Siloxane Coupling Agents" *Macromolecules* 1995, 28, 3110–3118. In the procedure discussed above the reaction between tetramethyldisiloxane and allyl-2-brmoisobutyrate is conducted in bulk, with a huge excess of silane (15:1) and at a temperature of 50° C. The first hydrosilation between vinyl-terminated polypropylene and tetramethyldisiloxane allows us use of a smaller excess of silane, as the concentration of unsaturated chain end is very low. Moreover, the reaction can be carried out in xylene and at a temperature close to room temperature. The reaction scheme, with inverted order of addition, is presented in Scheme 7.

"control" and/or "controlled" in reference to polymerization processes means that the polymerization process conditions are defined whereby the contributions of the chain breaking processes are insignificant compared to chain propagation, so that polymers with predetermined molecular weights, low polydispersities and tailorable, selected functionalities are achievable. The features of a controlled polymerization are well known and have been described in detail in application Ser. No. 09/972,260 now U.S. Pat. No. 6,624,262, which is herein incorporated by reference. For the present purposes "polymers" include homopolymers and copolymers (unless the specific context indicates otherwise), which may be block, random, statistical periodic, gradient star, graft, Scheme 7: Variant of the second route with inverted order.

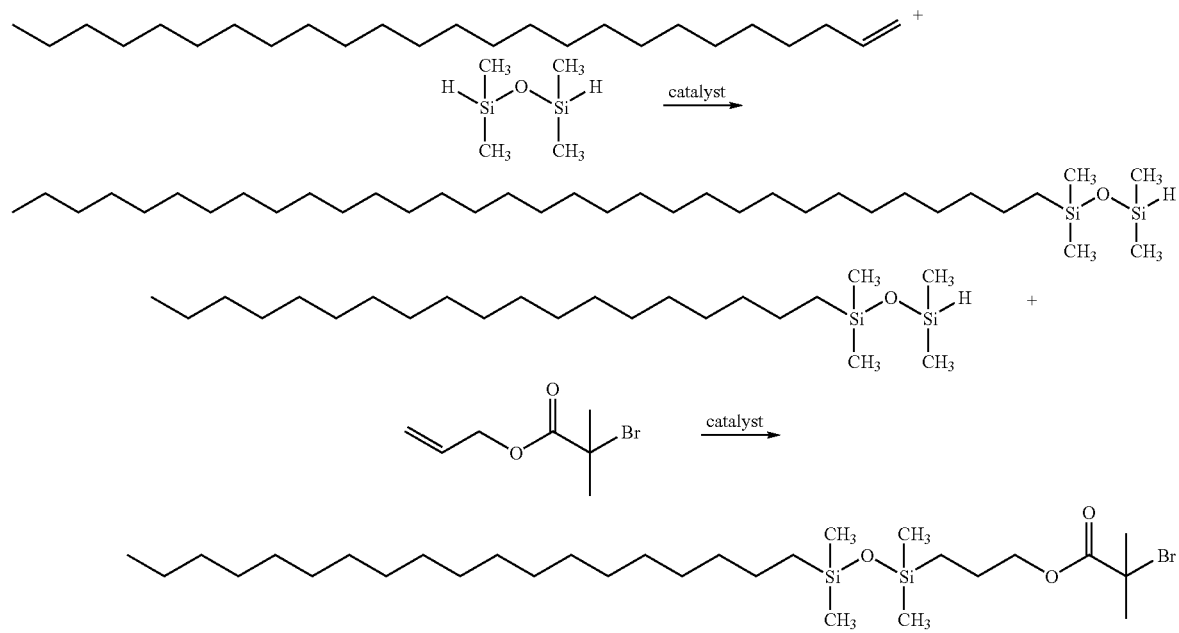

Both approaches allow the preparation of suitable macroinitiators to allow the successful preparation of block copolymers with an A block comprising polypropylene or a graft copolymer comprising improved incorporation of polypropylene macromonomers, according to the process of the present invention.

The use of a compatible macroinitiator to control the efficiency of initiation of a copolymerization also operates in inherently biphasic systems. When a catalyst for ATRP is dissolved in an ionic liquid and dispersed in a polymerization mixture containing a low molecular weight initiator the initiator initially migrates to the ionic liquid, forms a high concentration of radical species which undergo termination reactions, thereby leading to low initiator efficiency. However if a macroinitiator is employed the initiator does not migrate to the ionic liquid phase and high initiator efficiency is seen when the catalyst diffuses to the polymerization phase. This observation allows the use of environmentally benign ionic liquids in place of organic solvents in the preparation of graft copolymers and thereby provides a polymerization process that has lower environmental impact.

A "living" polymerization is a polymerization process where termination reactions are minimal. As used herein, comb, (hyper)branched or dendritic. The "(co)" parenthetical prefix in conventional terminology is an alternative, viz., "(co)polymer means a copolymer or polymer including homopolymer while "(co)polymerizable means a monomer that is directly polymerized by the polymerization mechanism being discussed and additionally a comonomer which can only be incorporated into the polymer by copolymerization. Similarly "(hyper)" is meant to incorporate the concept that the degree of branching along the polymer backbone can vary from a low degree of branching up to a very high degree of branching.

EXAMPLES

Analytical Measurements

GC: Monomer conversion was determined using a Shimadzu GC17A gas chromatograph equipped with an AO20ic autosampler and a FID detector using J&W Scientific 30 m DB608 column. Injector and detector temperatures were kept constant at 250° C. (Conditions: for butanone (internal standard)/n-butyl acrylate (monomer): start temperature 50° C., isotherm 0 min., heating rate 30° C./min., final temperature 160° C., isotherm 0 min.; for toluene (internal standard)/styrene (monomer): start temperature 40° C., isotherm 1 min., heating rate 20° C./min., final temperature 130° C., isotherm 0 min.) The conversion was calculated by detecting the decrease of the monomer peak area relative to the standard peak area. GC measurements were repeated 3–7 times for each sample to reduce errors.

GPC: Polymer molecular weights were estimated by a GPC equipped with a Waters WISP 712 autosampler, column setup (guard, $10^2$ Å, $10^3$ Å, $10^5$ Å; 5 µm; Polymer Standard Service (PSS), Germany), and a Waters 410 RI detector in THF (35° C.), at a flow rate of 1 mL/min. The setup was calibrated against low polydispersity poly(methyl methacrylate) (PMMA) or polystyrene (pS) standards (PSS, Germany) with toluene as internal standard. Weight average molecular weights were determined by using size exclusion chromatography equipped with Waters microstyragel columns (pore size $10^5$, $10^4$, $10^3$ Å) in THF as a solvent) a differential refractometer (Waters Model 410), light-scattering detector (DAWN Model F), a differential viscometer (Viscotek Model H502) and GPC Win software.

NMR: $^1$H-NMR characterization was performed on a Bruker 300 MHz spectrometer. The measurements were carried out in chloroform-d or methylene chloride-$d_2$. The amount of incorporated monomer in nBuA/S copolymers was determined by $^1$H-NMR measurements by comparison of the peak area ratio of characteristic signals for pnBuA (0.93 ppm, t, $^3J$=7.3 Hz, 3H, O—(CH$_2$)$_3$—C$\underline{H}_3$ and ppm=4.00, bs, 2H, O—C$\underline{H}_2$—CH$_2$—CH$_3$) and pS (7.23–6.10 ppm, m, 5H, Ar—H).

AFM: Scanning force micrographs were recorded at ambient conditions with a Nanoscope III instrument (Digital Instruments, St. Barbara, USA) operating in the tapping mode. The measurements were performed at ambient conditions (in air, 56% RH, 23° C.) using Si cantilevers with a spring constant of ≈50 N/m, a tip radius of 8 nm, and a resonance frequency of about 300 kHz. The set-point amplitude ratio was maintained at 0.9 to minimize the sample deformation induced by the tip. The samples for tapping mode SFM measurements were prepared by spin casting at 2000 rpm of dilute solutions (0.15 g/l) of brush molecules in chloroform.

Evaluation of molecular weights: Degrees of polymerization were estimated from conversion by assuming quantitative initiation for both initiator and macroinitiator, $DP_{conv}=\Delta[M]/[I]_o$. Molecular weights were estimated using GPC with refractive index detector (linear polystyrene or poly(methyl methacrylate) standards as well as using MALLS detector and universal calibration with LS and viscometry detectors.

1. General Procedure for Macroinitiator and Macromonomer Preparation.

The general procedure for preparation of macroinitiators and macromonomers was to polymerize n-butyl acrylate and t-butyl acrylate with a hydroxyl functionalized initiator. These first formed polymers may be macroinitiators for ATRP before the halogen end group is removed. Optionally, the halogen end group may be transformed into a functionality capable of initiating any polymerization process. For production of a radically polymerizable macromonomer, the halogen end group may be removed using tributyltin hydride and AIBN. The hydroxyl end group may then be esterified with methacryloyl chloride to provide a polymerizable double bond.

A series of macroinitiators and macromonomers were prepared using this approach and the molecular weights are listed in Table 1.

TABLE 1

Molecular weight data for polymers for use as macromonomers and macroinitiators.

| Sample | $M_n$* | $M_w/M_n$ | $DP_n$** |
|---|---|---|---|
| pnBA macromonomer | 3300 | 1.12 | 22 |
| ptBA macromonomer | 2900 | 1.13 | 18 |
| ptBA macromonomer | 5900 | 1.29 | 45 |

*based on GPC for final coupled/dehalogenated product.
**based on GPC data for initial (HO-pBA-Br) sample. Little or no variation was observed as polymer was transformed.

End group analysis was carried out on the first formed polymers, the macroinitiator form, using $^1$H NMR and ESI-MS. In the macroinitiator form, the resonances from the methine proton adjacent to the halogen end group (4.1 ppm) and the terminal hydroxyl group (3.1 ppm) are not detectable. However, after conversion to a macromonomer the vinyl protons are clearly visible (5.6 and 6.2 ppm).

ESI-MS also revealed the presence of a tin dimer (M/Z=600±1). The molecular weight of the macromonomer that was injected exceeded the detection limit of the instrument, however, the low molecular weight edge of the distribution is visible and shows the distribution of end group functionalities clearly. There is no evidence of residual halogen terminated polymer (m=132+128.2n+79/81+23) after reaction with tin bromide. The main series of peaks correspond to the sodium salt of the polymer with a saturated end group (m=132+128.2n+1+23) along with sister peaks corresponding to loss of one and two hydrogen atoms, respectively. After the esterification reaction with methacryloyl chloride, the main series of peaks correspond to the macromonomer product (m=200+128.2n+1+23) in addition to the same sister peaks with one and two fewer hydrogen atom(s). While there is considerable noise, there is no evidence of residual unfunctionalized polymer.

The first polymers prepared above may also be used as macroinitiators prior to removal of the radically active halogen on the chain end. They can therefore also be used for the preparation of block macromonomers by chain extension with different free radically polymerizable monomers prior to removal of the first halogen and esterification of the hydroxy group on the other polymer terminus.

1A. Macroinitiator, or Macromonomer Precursor, (HO-ptBA-Br):

The HO-functionalized initiator shown below, KB6-9; was used to synthesize a mono-hydroxyfunctionalised poly-t-butyl acrylate (HO-ptBA-Br). The reaction conditions had been defined by the polymerization of t-butyl acrylate using α-bromo-isobutyrate ethylester as initiator.

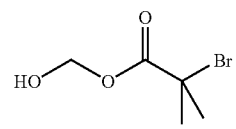

KB6-9

Experimental Conditions:
ratio of reagents; [KB6-9]:[t-BA]:[CuBr]:[CuBr$_2$]:[PM-DETA]=[1]:[67]:[0.25]:[0.0125]:[0.25]; solvent, acetone (20 vol %); reaction temperature 60° C.; conversion: 55% (GC) after 4 h.
Results: $M_{n,th}$=4700; $DP_{n,th}$=37. $M_n$=4500; $DP_n$=35; MWD=1.17.

1B. Macroinitiator, or Macromonomer Precursor (HO-pMMA-Br)

Experimental Conditions:

Ratio of reagents; [KB6-9]:[MMA]:[CuCl]:[dNbpy]=[1]:[250]:[0.75]:[1.5]; Anisole 2 vol %; reaction temperature 90° C. Conversion, 83% (GC) after 9 h. Results: $M_{n,th}$=25000;

1C. Block Co-Macroinitiator, or Co-Macromonomer Precursor (HO-ptBA-block-pSt-Br)

A block co-macroinitiator is a macroinitiator comprising a block copolymer and a block co-macromonomer is a macromonomer comprising a block copolymer. The preparation of a block co-macroinitiator or co-macromonomer precursor was accomplished by chain extension using the HO-ptBA-Br prepared in example 1A, as a macroinitiator to further polymerize styrene thereby preparing a block copolymer macroinitiator, or a block-co-macromonomer precursor.

Experimental Conditions:

ratio of reagents; [HO-(ptBA)$_{35}$-Br]:[styrene]:[CuBr]:[PMDETA]=[1]:[100]:[1]:[1];

reaction temperature 100° C.

Conversion: 96% (GC) after 140 min.

The GPC additionally displayed a clean shift to higher molecular weight.

Results: $M_{n,th}$=15000; $DP_{n,th}$=37+100. $M_n$=18300; MWD=1.11.

1D. Substitution Reaction (Br←→H) Conversion of a Macroinitiator to a Macromonomer.

A possible route to change the bromo atom into hydrogen is to use Bu$_3$SnH. The tin hydride and the products of the reaction, (tin bromide) may cause side reactions (termination or chain transfer) during the ATRP polymerization. To avoid this problem of metal contamination, or potential catalyst interactions various other reactions, shown above in Scheme 2, can be used for the transformation:

2. PMMA-g-poly(dimethylsiloxane) Graft Copolymers

PMMA-g-poly(dimethylsiloxane) (PDMS) graft copolymers samples were prepared using ATRP, RAFT, redox initiated polymerization and a conventional radical polymerization.

Materials. Copper chloride (CuCl) (98%, Aldrich) was purified by known procedures; 4,4'-Di-n-nonyl-2,2'-bipyridine (dnNbpy) was synthesized by a modified disclosed literature procedure. Methacrylate-terminated PDMS macromonomer (PDMS-MA) was prepared by the ring opening polymerization of hexamethylcyclotrisiloxane (D3) (98%, Aldrich) followed by reaction with 3-methacryloxypropyldimethylchlorosilane. Mn=2370 (toluene-GPC), Mw/Mn=1.25, the functionality of the terminal methacrylate group was 1.0 (H-NMR, in CDCl3).

Measurements. The conversion of MMA was measured using a Shimadzu GC-14A gas chromatograph (GC) equipped with a widebore capillary column (30 m, DB-Wax, J&W Sci.). The conversion of PDMS-MA was determined by the gel permeation chromatography measurements in toluene (toluene-GPC) using a Waters 510 liquid chromatograph pump (1 ml/min, 30° C.) equipped with columns (guard, 10 5 Å, 10 2 Å; Polymer Standards Service) in series with a Waters 2410 differential refractometer. [5] The molecular weight of the polymer was measured by GPC in tetrahydrofuran (THF-GPC) based on linear poly(methyl methacrylate) standards using a Waters 515 liquid chromatograph pump (1 ml/min, 30° C.) equipped with four columns (guard, 10 5 Å, 10 3 Å, 100 Å; Polymer Standards Service) in series with a Waters 2410 differential refractometer.

2A. Preparation of PDMS-Macromonomer with Terminal Methacrylate Functionality.

In a dry box, D3 (24.5 g, 0.11 mol) was placed into a 100 mL round bottom flask and dissolved in a mixture of THF (8 mL) and toluene (8 mL). n-Butyllithium in hexane (4 mL, 10 mmol) was added to this clear, colorless solution and the resulting solution was stirred for 2 hours at room temperature. 3-Methacryloyloxypropyldimethylchlorosilane (2.65 g, 12 mmol) predissolved in hexanes (1.5 mL) was added to the solution and the heterogeneous white mixture was stirred at room temperature overnight. All the volatile materials were removed at room temperature under vacuum (1 mmHg) over 5 hours and the mixture was stored in the freezer overnight. The mixture was diluted in 20 mL of hexanes and filtered to remove all salts. The solvent was removed from the filtrate by rotary evaporation and any remaining 3-methacryloyloxypropyldimethylchlorosilane was removed under 1×10−7 mmHg vacuum at 60° C. for four hours. The clear liquid was then stored in the freezer. Yield=17.6 g (72%). 1H-NMR (CDCl3) δ: 6.1 (s), 5.5 (s), 4.1 (t), 1.9 (s), 1.7 (m), 1.3 (m), 0.9 (t), 0.6 (m), 0.1 (s). Methacrylate terminal group functionality (F) was calculated from the relative peak intensity in the 1 H-NMR spectrum at 1.9 ppm (methyl 3H in methacrylate group) and 0.9 ppm (methyl 3H in butyl group) and was 1.0. Mn=2200, PDI=Mw/Mn=1.18 (determined by GPC in THF, PMMA calibration).

2B. Preparation of PDMS-Macroinitiator.

A PDMS-macroinitiator containing a 2-bromoisobutyrate terminal group was synthesized by anionic polymerization of D3 terminated by chlorodimethylsilane, followed by reaction with 3-butenyl 2-bromoisobutyrate. Yield, 78%. 1H-NMR (CDCl3) δ: 4.2 (t), 1.9 (s), 1.7 (m), 1.5 (m), 1.3 (m), 0.9 (t), 0.6 (m), 0.1 (s). The functionality (F=0.95) was calculated by comparison of the integrations of the methyl protons in bromoisobutyrate group at 1.9 ppm with the methyl protons in n-butyl group at 0.9 ppm in the 1H-NMR spectrum. Mn=15,600, Mw/Mn=1.10 (determined by GPC in THF, PMMA calibration).

3. ATRP Copolymerization Initiated by Ethyl 2-Bromoisobutyrate.

A typical polymerization is as follows: a PDMS-macromonomer (Mn=2200, PDI=1.18, F=1.0, 0.95 g, 0.43 mmol) was added to a 25 mL Schlenk flask equipped with a stir bar and was deoxygenated by degassing overnight and back-filling with nitrogen. CuCl (2.9 mg, 0.029 mmol) and dnNbpy (23.5 mg, 0.058 mmol) were placed in a 25 mL round bottom flask equipped with a stir bar. This flask was capped with a rubber septum, purged with nitrogen gas for half an hour, then charged with (0.82 g, 8.2 mmol) and deoxygenated xylene (0.95 mL) via syringes. The mixture was stirred at room temperature under nitrogen for about half an hour until a homogeneous maroon solution formed. This solution was cannula-transferred to the Schlenk flask under a nitrogen flow. Ethyl 2-bromoisobutyrate (EBiB) (4.2 μL, 0.029 mmol) was added to the flask through the capped arm on the flask. A 0.1 mL aliquot of the reaction mixture was removed and the flask was placed into a 90° C. oil bath under nitrogen. Periodically, 0.1 mL aliquots of the reaction mixture were removed for kinetic and molecular weight analysis. These samples were diluted with toluene to 30 wt %, subjected to GC to measure the MMA conversion, toluene-GPC to measure the macromonomer conversion and THF-GPC to determine the molecular weights of the generated copolymer. The results of ATRP copolymerization of MMA and a polydimethylsiloxane-macromonomer (PDMS-macromonomer) at 90 C are shown in Table 2.

TABLE 2

ATRP copolymerization of MMA and PDMS-Macromonomer

| Exp. No. | MMA, g | p-Xylene, wt ratio to MMA | PDMS-MM, g | M/MM/I/CuCl/Ligand mol ratio | Temp., C. | Time, hr | Yield, g | $M_n$ | $M_w/M_n$ |
|---|---|---|---|---|---|---|---|---|---|
| HS166 | 2.24 | 1:1.2 | 2.8 | 285/15/1/1/2 | 90 | 21.6 | 3.3 | 86,020 | 1.58 |

Macromonomer: HS134, $M_n$ = 2370
Initiator: ethyl 2-bromoisobutyrate
Ligand: 4,4'-di(n-nonyl)2,2'-bipyridine [dnNBPy]
Copolymer was isolated by reprecipitation(MeOH/Acetone).
$M_n$ and $M_w/M_n$ were calculated from THF-GPC.

Figure 2:
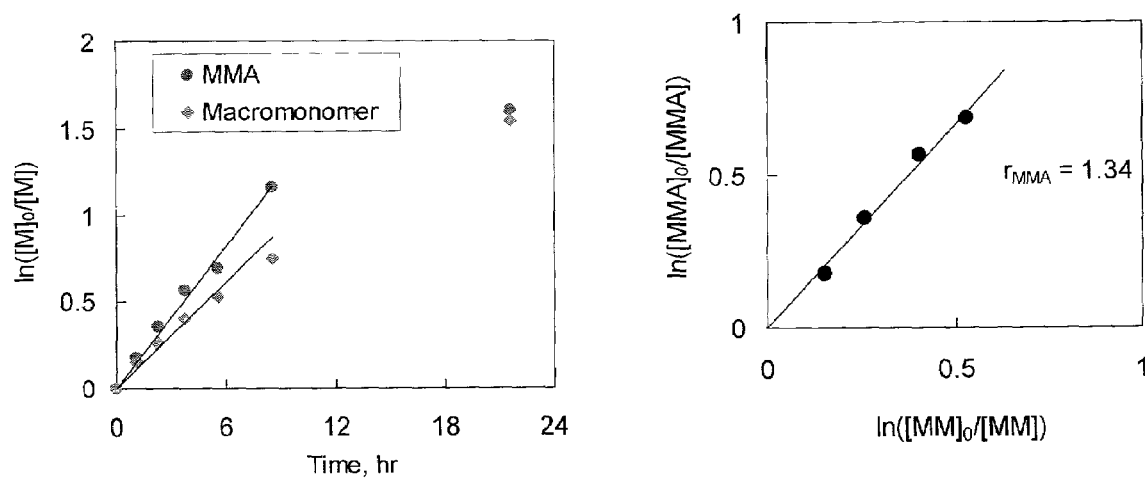
FIG. 2 re graphs of the kinetic data of the copolymerization and Jaacks plot for the ATRP copolymerization of MMA and PDMS macromonomer in xylene solution at 90° C. (HS166), the data indicates slow consistent incorporation of the macromonomer into the copolymer.

GPC traces showed slow consistent incorporation of the macromonomer into the copolymer. The kinetics of the copolymerization and the Jaacks plot for the copolymerization are shown in FIG. 2. The $r_{MMA}$ was 1.34.

After the reaction was completed, the reaction mixture was diluted with acetone, treated with ion change resin and passed through an alumina column. The solution was poured into methanol to precipitate the copolymer. Dissolution and reprecipitation from acetone/MeOH was repeated twice. About 3 g of copolymer were recovered. Toluene-GPC indicated that most of the unreacted PDMS-macromonomer was removed by the precipitation process. Copolymer contained less than 2 wt % of unreacted macromonomer.

3A. A TRP Copolymerization Initiated by PDMS-Macroinitiator.

A typical polymerization is as follows: A 25 mL Schlenk flask equipped with a stir bar containing a PDMS-macromonomer (Mn=2200, PDI=1.18, F=1.0, 0.84 g, 0.38 mmol) and a PDMS-macroinitiator (Mn=15600, PDI=1.10, F=0.95, 0.42 g, 0.025 mmol) was evacuated overnight and back-filled with nitrogen. In a 25 mL round bottom flask, a stir bar, CuCl (2.5 mg, 0.025 mmol), and dnNbpy (20.7 mg, 0.051 mmol) were placed. This flask was capped with a rubber septum, purged with nitrogen gas for half an hour, then deoxygenated MMA (0.72 g, 7.2 mmol) and deoxygenated xylene (1.62 mL) were added via syringes. The mixture was stirred at room temperature under nitrogen for about half an hour until a homogeneous maroon solution formed. This solution was cannula-transferred to the Schlenk flask a under nitrogen flow. The polymerization was performed at 90° C. and periodic sampling and measurements were done in the same way as in the case of the EBiB initiated reaction described above.

3B. A TRP Copolymerization of MMA and PDMS-Macromonomer (75° C., in Solution)

Since almost all of the ATRP copolymerizations had been run at 90° C., in order to compare directly with the RAFT system, an ATRP polymerization was run at 75° C.

| Exp. No. | MMA, g | p-Xylene, wt ratio to MMA | Macromonomer (SiM), g | M/SiM/I/CuCl/Ligand mol ratio | Temp., C. |
|---|---|---|---|---|---|
| HS160 | 0.77 | 1:1 | 0.96 | 285/15/1/1/2 | 75 |

Macromonomer: HS134, Mn = 2370(DP32), PDI = 1.25, F = 1.0
Initiator: ethyl 2-bromoisobutyrate
Ligand: 4,4'-di(n-nonyl)2,2'-bipyridine [dnNBPy]

The reactivity ratio $r_{MMA}$ was found to be 1.37. This value was slightly higher than ATRP at 90° C. This can be attributed to the increased solution viscosity at lower temperature.

4. RAFT Polymerization of MMA

Materials. 2-Phenylprop-2-yl dithiobenzoate (cumyl dithiobenzoate, (CDB)) was synthesized by the reaction of dithiobenzoic acid with α-methylstyrene in carbon tetrachloride at 70° C. for 4 hours and then purified by column chromatography on alumina with hexane as eluent. The dithiobenzoic acid was prepared by the reaction of benzyl chloride with elemental sulfur and sodium methoxide. Benzoyl peroxide (BPO) (Fisher, 75%) and 2,2'-azobisisobutyronitrile (AIBN) (98%, Aldrich) were used as received.

Polymerizations. The conditions for the RAFT copolymerization of MMA and PDMS macromonomer were defined by conducting a series of scoping experiments to determine effective reaction conditions. In the initial experiment MMA was polymerized by RAFT method at 75° C. with AIBN as initiator and 2-phenylprop-2-yl dithiobenzoate (cumyl dithiobenzoate, (CDB)) as addition-transfer fragmentation agent in their molar ratio of MMA/AIBN/CDB=300/1/0.5. (Run HS156.) The molecular weight of the resulting copolymer was higher than the theoretical line. This was attributed to the rather high reaction temperature leading to rapid decomposition of the AIBN so that many radicals were initially generated and transfer agent (CDB) didn't work well.

Therefore, conditions similar to those reported by Rizzardo in the literature were used, except the reaction was run in xylene not in benzene (HS157-1). Two additional scooping experiments were run; one at 60 C with AIBN in diluted concentration (HS157-2) and the other at 75 C with benzoyl peroxide as initiator since benzoyl peroxide decomposes at a slower rate than AIBN in diluted concentration (HS157-3). All three conditions polymerized MMA in controlled manner. The copolymerization of MMA and PDMS macromonomer were run under the same conditions as HS157-3 shown below.

these RAFT experiments, the polymerization rate was somehow accelerated at the later stage. The kinetics plot well fit to the line of $\ln([M]_0/[M])=kt^2$ rather than $\ln([M]_0/[M])=kt$. The toluene-GPC showed continuous increase of the amount and molecular weight of copolymer along with the continuous decrease in the concentration of macromonomer. From the toluene-GPC of the periodical samples, PDMS-macromonomer conversions were calculated and their negative exponential values were plotted against the reaction time.

| Exp. No. | MIMA, g | p-Xylene, wt. ratio to MMA | Dithioester (CDB), mg | Catalyst | MMA/CDB/Catalyst mol ratio | Temp., C. |
|---|---|---|---|---|---|---|
| HS156 | 2.5 | 1:1 | 23 | AIBN | 300/1/0.5 | 75 |
| HS157-1 | 3.0 | 1:0.29 | 14 | AIBN | 639/1/0.56 | 60 |
| HS157-2 | 3.0 | 1:1 | 30 | AIBN | 300/1/0.5 | 60 |
| HS157-3 | 3.0 | 1:1 | 30 | BzPO | 300/1/0.5 | 75 |

CDB: 2-phenylprop-2-yl dithiobenzoate(cumyl dithiobenzoate)
AIBN: 2,2'-Azobisisobutyronitrile, $k_d = 0.8 - 1.2*10^{-5}$ at 60 C. in Bz, $9.5*10^{-5}$ at 77 C. in xylene.
BzPO: Benzoyl peroxide, $k_d = 2.6*10^{-5}$ at 75 C. in Bz.

4A. RAFT Copolymerization of MMA and PDMS-Macromonomer (5 mole %) (75° C., in Solution)

In a typical RAFT copolymerization, a 25 mL Schlenk flask equipped with a stir bar and containing a PDMS-MA (1.00 g) was evacuated overnight and then filled with nitrogen. The free radical initiator and addition-transfer fragmentation agent and deoxygenated MMA (0.80 g) were mixed in a separate 25 mL round bottom flask under nitrogen and dissolved in deoxygenated xylene (0.80 g). This solution was cannula-transferred to the Schlenk flask under a nitrogen flow. A 0.1 mL aliquot of the reaction mixture was removed and the flask was placed into a 75° C. oil bath under nitrogen. Periodically, 0.1 mL aliquots of the reaction mixture were removed for the kinetic and molecular weight analysis. The conditions are summarized below.

The reactivity ratio of MMA ($r_{MMA}$) obtained from Jaaks plot was 1.64. The molecular weight estimated from THF-GPC increased according to the monomer conversion and showed a sudden jump at high conversion. The polydispersity remained lower than 1.3 until the conversion reached 68%.

4B. RAFT Copolymerization of MMA and PDMS-Macromonomer, (60° C., in Solution)

The reaction was run at 60° C. in order to determine how the temperature affects the reactivity. If the relative ratio of the rate of the transfer reaction to monomer addition reaction can be changed by changing temperature a change in the reactivity ratio of the macromonomer may be detected.

| Exp. No. | MMA, g | p-Xylene, wt. ratio to MMA | Macromonomer (MM), g | Dithioester (CDB), mg | Catalyst | MMA/MM/CDB/Catalyst mol ratio | Temp., C. |
|---|---|---|---|---|---|---|---|
| HS159 | 0.8 | 1:1 | 1.0 | 8.5 | BzPO | 285/15/1/0.5 | 75 |

Macromonomer: HS134, Mn = 2370(DP32), PDI = 1.25, F = 1.0
CDB: 2-phenylprop-2-yl dithiobenzoate(cumyl dithiobenzoate)
BzPO: Benzoyl peroxide, kd = 2.6*10-5 at 75 C. in Bz.

The GC analysis revealed that MMA was consumed at the similar rate ($k_p^{MMA}=4.7*10^{-5}$) as RAFT homopolymerization of MMA ($k_p^{MMA}=5.5*10^{-5}$). It seemed that in all of Conditions for RAFT copolymerization of MMA and PDMS-Macromonomer are summarized in the following Table.

| Exp. No. | MMA, g | p-Xylene, wt. ratio to MMA | Macromonomer (MM), g | Dithioester (CDB), mg | Catalyst | MMA/MM/CDB/Catalyst mol ratio | Temp., C. |
|---|---|---|---|---|---|---|---|
| HS164 | 2.15 | 1:1 | 2.48 | 23.0 | AIBN | 285/15/1/0.5 | 60 |

Macromonomer: HS94, Mn = 2200, PDI = 1.18, F = 1.0
CDB: 2-phenylprop-2-yl dithiobenzoate(cumyl dithiobenzoate)

In this example the reactivity ratio of MMA ($r_{MMA}$) calculated by the Jaacks method was 1.70, therefore, $1/r_{MMA}$ was 0.59. This value was very close to the case when the RAFT was done at 75° C.; example 11, and a reactivity ratio of $1/r_{MMA}$=0.61. Both RAFT copolymerizations yielded reactivity ratio's lower than that in ATRP ($1/r_{MMA}$=0.73). This is probably due to the relatively faster monomer addition in the RAFT polymerization compared with ATRP.

5. Conventional Radical Copolymerization Initiated by AIBN.

A 25 mL Schlenk flask equipped with a stir bar containing a PDMS-macromonomer (Mn=2200, PDI=1.18, F=1.0, 0.98 g, 0.44 mmol) was evacuated overnight. The flask was filled with nitrogen and evacuated again. The degassing/back-filling procedure was repeated three times, and finally the flask was filled with nitrogen. AIBN (3.6 mg, 0.022 mmol) was added to a separate 25 mL round bottom flask equipped with a rubber septa and a stir bar. This flask was purged with a nitrogen gas flow for more than half an hour. Deoxygenated p-xylene (0.97 mL) and deoxygenated MMA (0.84 g, 8.36 mmol) were added via syringes. After the AIBN dissolved, the clear solution was cannula-transferred to the Schlenk flask under a nitrogen flow. A 0.1 mL aliquot of the reaction mixture was removed and the flask was placed into a 75° C. oil bath under nitrogen. Periodically, 0.1 mL aliquots of the reaction mixture were removed for kinetic and molecular weight analysis. These samples were diluted with toluene to 30 wt %, subjected to GC to measure MMA conversion, toluene-GPC for the macromonomer conversion, and the THF-GPC to calculate the molecular weight of the generated copolymer.

5A. Conventional Radical Copolymerization Initiated by PDMS-macro-azo initiator.

A 25 mL Schlenk flask with a stir bar, containing a PDMS-macromonomer (Mn=2200, PDI=1.18, F=1.0, 1.00 g, 0.45 mmol) was evacuated overnight. A PDMS-macroazo initiator (0.23 g, 0.023 mmol of azo group) was placed in a separate 25 mL round bottom flask, equipped with a stir bar, and sealed with a rubber septa. This flask was also evacuated overnight. These two flasks were filled with nitrogen and evacuated again. After this degassing/back-filling procedure was repeated three times, both the flasks were filled with nitrogen. Deoxygenated p-xylene (1.41 mL) and deoxygenated MMA (0.87 g, 8.63 mmol) were added to the round bottom flask via syringes. After the PDMS-macroazo initiator dissolved, the clear solution was cannula-transferred to the Schlenk flask under a nitrogen flow. The polymerization was performed at 75° C. and periodical sampling and measurements were done in the same way as in the case of AIBN initiated reaction described above.

The incorporation of the monomers into the copolymer were followed and the reactivity ratio's determined from a Jaacks plot. In contrast to the controlled ATRP polymerization, the $r_{MMA}$ in the conventional radical polymerization was high and the resulting copolymer was heterogeneously branched. In contrast to the controlled polymerizations where heterogeneous branching is seen as a distribution along a polymer chain in standard radical polymerization this heterogeneous distribution is seen among the polymer chains. The polydispersity became quite large. The copolymer was isolated by precipitation (MeOH/acetone) and the amount of residual macromonomer was decreased to less than 3 wt %.

6. Redox Initiated Copolymerization MMA and PDMS-Macromonomer with Small Molecule Initiator.

A 25 mL round bottom flask equipped with a stir bar containing a PDMS-macromonomer (Mn=2370, PDI=1.25, F=1.0, 1.04 g, 0.44 mmol) was evacuated overnight and back-filled with nitrogen. In a 25 mL Schlenk flask, were placed a stir bar, CuBr (4.2 mg, 0.029 mmol), copper ($Cu^0$) powder (7.4 mg, 0.117 mmol), Me4-cyclam (7.5 mg, 0.029 mmol). After this Schlenk flask was purged with nitrogen gas for half an hour, deoxygenated MMA (0.83 g, 8.3 mmol) was added and the solution was stirred under nitrogen for half an hour. Deoxygenated xylene (0.96 mL) was added into the round bottom flask and the PDMS-macromonomer was dissolved. This macromonomer solution was cannula-transferred to the Schlenk flask under a nitrogen flow. Ethyl 2-bromoisobutyrate (4.3 μL, 0.029 mmol) was added to the flask through the capped arm on the flask. The polymerization was performed at 75° C. and periodic sampling and measurements were done in the same way as in the case of the ATRP reaction described above. In this system, the rate of deactivation was quite slow so that the reaction proceeds similar manner to the conventional radical polymerization. By Jaack's plot, the reactivity ratios of MMA and PDMS-macromonomer were 2.58 and 0.39 respectively.

6A. Redox Initiated Copolymerization of MMA and PDMS-Macromonomer with PDMS-Macroinitiator MMA and PDMS-macromonomer were copolymerized in xylene with use of CuBr as a catalyst, a PDMS-MI having 2-bromoisobutyrate terminal group as an initiator, and cyclam as a ligand. The results are shown in Table 3.

| Exp. No. | MMA, g | p-Xylene, wt. ratio to MMA | PDMS-MM, g | MMA/MM/AIBN mol ratio | Temp., C. | Time, hr | Yield, g | $M_n$ | $M_w/M_n$ |
|---|---|---|---|---|---|---|---|---|---|
| HS170 | 2.3 | 1:1.5 | 2.82 | 380/20/1 | 75 | 5.5 | 3.4 | 139,400 | 5.68 |

Macromonomer: HS134, Mn = 2370
Copolymer was isolated by reprecipitation(MeOH/Acetone).
$M_n$ and $M_w/M_n$ were calculated from THF-GPC.

TABLE 3

Redox initiated copolymerization of MMA and macromonomer

| Exp. No. | MMA, g | p-Xylene, wt. ratio to MMA | Macromonomer (SiM), g | Macroinitiator (MI), g | M/SiM/MI/CuBr/Ligand/Cu[0] mol ratio | Temp., C. |
|---|---|---|---|---|---|---|
| HS146 | 0.82 | 1:1 | 0.99 | 0.43 | 285/15/1/1/1/5 | 75 |

Macromonomer: HS134, Mn = 2370, DP = 32, f = 1.0
Macronitiator: HS98, Mn = 15590, Mw/Mn = 1.10, f = 0.95
Ligand: 1,4,8,11-tetramethyl-1,4,8,11-tetraazacyclotetradecane [cyclam]

By the Jaack's plot, the reactivity ratios of MMA and PDMS-macromonomer were 1.90 and 0.53 respectively. Comparing to the case of redox polymerization with a low molecular weight initiator (ethyl 2-bromoisobutyrate), incorporation of PDMS-macromonomer to the copolymer was accelerated.

7. Summary of PDMS-Macromonomer Copolymerization with MMA

The relative reactivity ratios of MMA and PDMS-macromonomer in various radical based polymerization systems are summarized in Table 4.

be ignored the beneficial effect of use of a macroinitiator increased the reactivity of the macromonomer to a smaller extent.

3.) The beneficial effect of use of a compatible macroinitiator in ATRP was obvious when the polymerization was done at higher concentration of macromonomer because the growing chain and macromonomer have good compatibility each other.

The reduced reactivity of macromonomer will affect the final copolymer structure in different ways in RAFT and in the conventional free radical systems. In a RAFT process, all

TABLE 4

Polymerization processes, reaction conditions and reactivity ratios.

| Polymerization type | | Exp. No. | Initial polymer concentration, wt % | Initial weight ratio MMA.SiM | $[MMA]_0$, mol/L | $[MM]_0$, mmol/L | $\frac{[MMA]_0}{[SiM]_0}$ | Temp., C. | $r_1$[a] | $1/r_1$[a] |
|---|---|---|---|---|---|---|---|---|---|---|
| ATRP | Solution | HS119 | 37 | 0.85 | 2.9 | 155 | 19.0 | 90 | 1.24 | 0 81 |
|  | Solution | HS160 | 38 | 0.80 | 2.9 | 151 | 19.1 | 75 | 1.37 | 0.73 |
|  | bulk | HS117 | 51 | 0.86 | 4.3 | 223 | 19.2 | 90 | 2 05 | 0.49 |
| ATRP/MI | Solution | HS130 | 37 | 0.86 | 2.0 | 104 | 18.9 | 90 | 1.36 | 0.74 |
|  | bulk | HS120 | 62 | 0.83 | 3.3 | 180 | 18.7 | 90 | 1.17 | 0.85 |
|  | bulk | HS124 | 61 | 0.86 | 3.4 | 180 | 19.0 | 75 | 1.62 | 0.62 |
| RP | Solution | HS110 | 37 | 0.86 | 2.9 | 155 | 18.9 | 75 | 3.07 | 0.33 |
| RP/MI | Solution | HS128 | 37 | 0.87 | 2.4 | 128 | 19 0 | 75 | 2.37[b] | 0 42[b] |
| Redox | Solution | HS138 | 38 | 0.81 | 2.9 | 152 | 19 0 | 75 | 2 58 | 0 39 |
| Redox/MI | Solution | HS146 | 46 | 0 83 | 2.4 | 128 | 19.0 | 75 | 1.90 | 0.53 |
| RAFT | Solution | HS159 | 38 | 0.80 | 2.9 | 151 | 19.0 | 75 | 1.64 | 0.61 |
|  | Solution | HS164 | 37 | 0.86 | 3.4 | 156 | 21.7 | 60 | 1 70 | 0.59 |
| Muller et al. MMA/PMMA(Pn = 15) RP | | no.38 | 2.0 | 0.8 | 0.12 | 97 | 12.4 | 60 | 1.53 | 0 65 |
|  |  | no.19 | 5.2 | 0.6 | 0.23 | 26 | 8.8 | 60 | 1.55 | 0.65 |
|  |  | no.24 | 10.1 | 0.6 | 0.46 | 52 | 8.8 | 60 | 2 14 | 0.47 |
|  |  | no.20 | 248 | 0.6 | 1.16 | 133 | 8.7 | 60 | 2.04 | 0.49 |
|  |  | no.21 | 38.2 | 0.6 | 1.89 | 214 | 8.8 | 60 |  |  |
|  |  | no.39 | 2.0 | 6.9 | 1.02 | 10 | 102 | 60 | 1.12 | 0.89 |
|  |  | no.44 | 5.0 | 7.3 | 27 | 25 | 108 | 60 | 1.23 | 0 81 |

[a]Determined by Jaack's plot. $[MMA]_0$: 9.35 mol/L (MMA homopolymeriation in bulk)
[b]Average value. 4.5 mol/L (MMA/MM(95/5) copolymerization in bulk)

As a whole, these results can generally be summarized as follows:

1.) In a controlled polymerization process such as ATRP the incorporation of the macromonomer into the polymer was greatly improved compared to a conventional radical polymerization, viz. the higher reactivity ratio of macromonomer, because the slow propagation rate allows one to ignore, or reduce the effects of diffusion control.

2.) Use of a compatible macroinitiator with the macromonomer can accelerate the incorporation of macromonomer into the copolymer in all radical polymerization processes. However, in the case where the propagation rate is high and the diffusion control can't chains propagate simultaneously, therefore, every polymer chain will have similar branching structure although it may be intramolecularly heterogeneous. On the other hand, in the conventional radical process, the copolymer generated at the early stage of the polymerization has a totally different structure from that of the copolymer generated at the later stage. This phenomenon is due to the slow initiation throughout the reaction and progressive change in the feed composition as the comonomers are consumed at different rates. This leads to an intermolecularly heterogeneous structure for the copolymer although the degree of heterogeneity between the chains is less when a macroinitiator is employed.

In Table 5, the characterizations of PMMA-g-PDMS copolymer samples obtained so far are summarized.

TABLE 5

PMMA-g-PDMS copolymer samples for the study of properties.

| Sample code | Polymerization type | Amount, g | $r_{MMA}$ | Branch disribution | | $M_n$ | $M_w/M_n$ | Mol % PDMS in copolymer | Residual MM, wt % |
| --- | --- | --- | --- | --- | --- | --- | --- | --- | --- |
| | | | | Intramol | Intermol | | | | |
| HS166 | ATRP | 32 | 1.34 | homo | homo | 86,020 | 1.58 | | 1.3 |
| HS164 | RAFT | 32 | 1.70 | hetero | homo | 101,600 | 2.59 | | 2.7 |
| HS170 | Conv radical | 34 | 2.00 | hetero | hetero | 139,400 | 5.69 | | 2.9 |

ATRP can be used to prepare homogeneously branched graft copolymers. The copolymers prepared using a conventional free radical method were heterogeneous in terms of copolymer composition, branching regularity, and molecular weights. However, control of concentration of macromonomers and other monomers during the polymerization and selection of the reactive end groups could produce more homogenously branched polymers by conventional free radical polymerization. Graft copolymers obtained by ATRP (in both solution and semi-bulk) have predetermined molecular weights with much lower polydispersities than obtained in the conventional radical systems. In summary, the combination of ATRP and a macroinitiator that is soluble in the macromonomer is an effective way to control the graft copolymer structure in terms of main chain length/polydispersity and branch distribution/homogeneity.

RAFT also prepares a homogeneous graft copolymer but one with a more heterogeneous distribution of grafts along the backbone. Such a distribution can be considered a gradient copolymer between the low molecular weight monomer and the macromonomer. RAFT polymerizations may also prepare homogenously distributed grafts by modification of the reactive end groups of the macromonomers using blends of macromonomers or controlling the concentrations of macromonomers in the polymerization process.

8. Synthesis of PLLA-Macromonomer and its Copolymerization with MMA.

Materials. Tetrahydrofuran (THF) was distilled from purple sodium benzophenone ketyl solutions. Methyl methacrylate (MMA) (99%, Acros) was washed three times with 5% aqueous sodium hydroxide and once with water. After drying with magnesium sulfate, MMA was distilled from calcium chloride. 2-Hydroxyethyl methacrylate (HEMA) (97%, Aldrich) and 2-hydroxyethyl acrylate (HEA) (96%, Aldrich) were both dried over molecular sieves and distilled. MMA and p-xylene were deoxygenated by bubbling nitrogen gas through them for more than one hour just before the polymerization. High purity L-lactide (L-LTD) (>99.9%) and D-lactide (D-LTD) (>99.9%) were supplied by Mitsui Chemicals and purified by recrystallization from toluene and dried in vacuum (<3 mmHg) overnight at room temperature. Copper chloride (CuCl) (98%, Aldrich) was stirred in glacial acetic acid overnight, filtered, and washed with absolute ethanol and ethyl ether under nitrogen. The solid was dried under vacuum at room temperature overnight. 4,4'-Di-n-nonyl-2,2'-bipyridine (dnNbpy) was synthesized by a modified literature procedure. Ethyl 2-bromoisobutyrate (EBiB) (98% Aldrich), benzoyl peroxide (BPO) (Fisher, 75%), stannous octoate (SnOct) (Alfa Aesar, technical grade) and all other reagents were used as received.

Measurements. Gel permeation chromatography (GPC) measurements in THF were conducted using a Waters 515 liquid chromatograph pump (1 mL/min, 30 °C.) equipped with four columns (guard, 10 5 Å, 10 3 Å, 100 Å; Polymer Standards Service) in series with a Waters 2410 differential refractometer with diphenyl ether as an internal standard. The molecular weights of the copolymers were determined based on low polydispersity poly(methyl methacrylate) (PMMA) standards. The conversion of MMA was measured on a Shimadzu GC-14A gas chromatograph (GC) equipped with a FID detector using a widebore capillary column (30 m, DB-Wax, J&W Sci.). Injector and detector temperature: 250° C.; column temperature: 40° C. for 2 minutes followed by an increase to 160° C. at the rate of 40° C./min and held for 2 minutes. The 1H-NMR in deuteratred chloroform (CDCl3) was measured with a 300 MHz Bruker spectrometer using Tecmag data acquisition software.

Syntheses. PLA macromonomers were prepared by a ring opening polymerization of lactide using 2-hydroxyethyl methacrylate or 2-hydroxymethyl acrylate as the initiator. Lactide is often contaminated by a small amount of hydroxy-compounds such as lactic acid, lactic acid dimer, and water.31 It is extremely important to use highly purified lactide for the macromonomer preparation because these impurities can act as undesirable initiators in the lactide polymerization and produce non-functionalized PLA and decrease the functionality.

8A. ATRP of MMA in the Presence of Stannous Octoate.

Since a polylactic acid macromonomer with a methyl methacrylate end group (PLA-macromonomer), prepared by the ring-opening polymerization of lactide using stannous octoate (SnOct) as a catalyst, may contain a certain amount of Sn catalyst residue, the effect of tin on an ATRP polymerization was determined. Under optimal conditions for lactide polymerization, 0.08 wt % SnOct may be used. If this crude macromonomer was used at 5 mol % PLA-macromonomer for copolymerization with MMA, a maximum of 7.5 mol % of SnOct per MMA could be contained in the reaction mixture. Therefore, MMA was polymerized by ATRP in the presence and in the absence of SnOct to determine whether SnOct will interfere the ATRP. The results are shown in Table 6.

TABLE 6

ATRP of MMA.

| Exp. No. | MMA, g(mmol) | Initiator | Xylene, g | MMA/I/CuCl/Ligand[b] mol ratio | Sn Oct[c], mol % to Cu | Temp, C. | Time, hr | Conversion[d], % | $M_n$[e] | $M_w/M_n$[e] |
|---|---|---|---|---|---|---|---|---|---|---|
| HS162-1 | 2.0(20) | EBiB[a] | 2.0 | 300/1/1/2 |  | 90 | 6.4 | 49 | 18,000 | 1.13 |
| HS162-2 | 2.0(20) | EBiB[a] | 2.0 | 300/1/1/2 | 7.5 | 90 | 6.3 | 64 | 21,600 | 1.09 |

[a]EBiB: ethyl 2-bromoisobutyrate.
[b]Ligand: 4,4'-di(n-nonyl)-2,2'-bipyridine [dnNBPy].
[c]Stannous octoate.
[d]Determined by GC
[e]Determined by GPC(THF, PMMA standard).

Addition of SnOct to an ATRP polymerization of MMA seemed to be accelerate the polymerization rate and provide a polymer with narrower MWD; however his observation could be within experimental error. The molecular weight increase was linear and changes for both cases were similar. In conclusion, it is suggested that SnOct does not interfere significantly the ATRP.

8B. Preparation of M-PLLA-Macromonomer
  Methacrylate-terminated Poly(L-lactic acid) Macromonomer (M-PLLA)(Run HS-168)

L-LTD (20.0 g, 0.14 mol) was placed into a 100 mL round bottom flask equipped with a stir bar. After a toluene solution of SnOct (16 mg/mL-toluene) was added, the flask was capped with a rubber septa and vacuumed (1 mmHg) through a needle for more than three hours. The flask was filled with nitrogen gas, and HEMA (0.9 g, 5 mol %/LTD) was added via a syringe. The reaction flask was immersed in an oil bath of 120° C. and L-LTD was melted with stirring. Although the reaction mixture solidified in about one hour, the reaction was continued for three hours. After cooling, the reaction mixture was dissolved in chloroform (40 mL) and poured into 2-propanol (800 mL). The precipitated polymer was recovered by filtration and washed with cold methanol and dried in vacuum at room temperature. Yield=18.6 g (89%). The functionality (F=1.0) was calculated from the NMR peak intensities at $\delta=1.9$ ppm (s, 3H, methyl) for the methacrylate end-group and at $\delta=4.4$ ppm (q, 1H, methine) for the 2-hydroxypropionate end-group. The number average molecular weight (Mn=2800) was estimated from the peak intensities at $\delta=5.2$ ppm for the ester methine protons in the polyester chain and at $\delta=4.4$ ppm (q, 1H, methine) for the 2-hydroxypropionate end-group. Mw/Mn=1.16 (by GPC).

8C. Methacrylate-Terminated Poly(D,L-lactic acid) Macromonomer
  (M-PDLLA)(HS 177-2)

An amorphous M-PDLLA was prepared by the same procedure as M-PLLA except using a mixture of L-LTD (10 g, 0.07 mol) and D-LTD (10 g, 0.07 mol) as the monomer. The polymerization was performed at 130° C. for 2.5 hr. Yield=18.7 g (89 %). F=0.99 (by 1H-NMR). Mn=3350 (by 1H-NMR). Mw/Mn=1.20 (by GPC).

8D. Acrylate-Terminated Poly(L-lactic acid) Macromonomer (A-PLLA)
  (HS177-3)

A-PLLA was prepared by replacing HEMA with HEA in the method for M-PLLA synthesis. The polymerization was performed at 120° C. for 2.5 hr. Yield=19.9 g (96%). F=0.98 (by 1H-NMR). Mn=2690 (by 1H-NMR). Mw/Mn=1.22 (by GPC).

TABLE 7

Summary of ring-opening polymerizations of lactide(LTD).

| Exp. No. | L-LTD, g(mol) | D-LTD | Initiator, mol % | SnOct, mol % | Temp., C. | Time, hr | Yield, g(%) | $M_n$ (by NMR) | $M_n$ (by GPC) | $M_w/M_n$ |
|---|---|---|---|---|---|---|---|---|---|---|
| HS168 | 20(0.14) |  | HEMA 5.2 | 0.028 | 120 | 3 | 18.6(89) | 2,800 | 4,580 | 1.16 |
| HS177-1 | 10(0.07) |  | HEMA 10.7 | 0.028 | 120 | 2.5 | 7.3(67) | 1,770 | 2,500 | 1.13 |
| HS177-2 | 10(0.07) | 10(0.07) | HEMA 5.0 | 0.028 | 130 | 2.5 | 18.7(89) | 3,350 | 4,737 | 1.20 |
| HS177-3 | 20(0.14) |  | HEA 5.5 | 0.028 | 120 | 2.5 | 19.9(96) | 2,690 | 5,101 | 1.22 |

HEMA: 2-hydroxyethyl methacrylate, HEA: 2-hydroxy acrylate.
SnOct: stannous octoate.
Polymer was isolated by reprecipitation(2-propanol/chloroform).
$M_n$ was evaluated by both H-NMR spectroscopy and THF-GPC.
$M_w/M_n$ was calculated by THF-GPC.

Highly functionalized, low polydispersity PLLA-macromonomers were obtained. Although the molecular weight from GPC was higher than the value from NMR, it is consistent with our knowledge (Mn from GPC is about 1.5 times higher than actual molecular weight). This macromonomer was obtained as a white powder, soluble in chloroform, THF, hot toluene, hot xylene.

TABLE 8

Characterization and solubility of the PLA macromonomers

| Exp. No. | Terminal group | D/L form | Crystalinity | $M_n$ (NMR) | Solubility |  |  |  |  |  |  |  |
|---|---|---|---|---|---|---|---|---|---|---|---|---|
|  |  |  |  |  | $CHCl_3$ | THF | Toluene | Xylene | Acetone | 2-Propanol | Methanol | n-BA |
| HS168 | methacryloyl | L | Crystalline | 2,800 | s | s | sg | sg | ps | i | i |  |
| HS177-1 | methacryloyl | L | Crystalline | 1,770 | s | s | sg | sg | s | i | ps | sg |
| HS177-2 | methacryloyl | DL | Amorphous | 3,350 | s | s | s | s | s | i | ps | s |
| HS177-3 | acryloyl | L | Crystalline | 2,690 | s | s | sg | sg | ps | i | i |  |

Solubility;
s: soluble,
i: insoluble,
ps: partially soluble,
sg: soluble when hot but swollen gel when cold.

Sample HS177-1 was prepared to improve the solubility of the macromonomer and reduce the viscosity in the copolymerization mixture. HS177-2 was prepared in order to determine if the solubility and crystallinity had an affect on the macromonomer reactivity. HS177-3 was initially prepared for its copolymerization with acrylate monomer such as butyl acrylate. All of the macromonomers were obtained with predetermined molecular weights and narrow polydispersities. The methacryloyl terminated PLLA macromonomers will be called as M-PLLA-macromonomer and acryloyl terminated PLLA macromonomer will be called as A-PLLA-macromonomer. Poly(L-lactide) will be called PLLA, poly(DL-lactide) will be called PDLLA, and poly (D-lactide) will be called PDLA.

GPC study: Similar to the study of PDMS-macromonomer, a GPC study was done for the PLLA-macromonomers. THF solutions of the mixture of PLLA-macromonomer and PMMA with their various compositions were prepared and subjected to the THF-GPC measurement. Polymer composition and their peak intensities (area) showed a good linearity. The peak intensity ratio of PMMA to PLLA was found to be 2.17. THF solutions of the mixture of PLLA-macromonomer and PBA with their various compositions were prepared and subjected to THF-GPC measurement. Polymer composition and their peak intensities (area) showed a good linearity. The peak intensity ratio of PBA to PLLA was found to be 1.29.

8E. Copolymerization of M-PLLA-Macromonomer and MMA Using ATRP

ATRP copolymerization of M-PLLA-macromonomer and MMA was performed at 90° C. The concentration of M-PLLA-macromonomer in the feed was 3.5 mol %, or 50 wt %. The target degree of polymerization was 300. Initially, diphenyl ether (wt ratio to MMA: 1.7) was used for the solvent, but the M-PLLA-macromonomer solution became a gel at 90° C. Therefore, xylene (wt ratio to MMA: 1.0) was added to the flask via a cannula to form a solution which seemed to be clear and homogeneous at 90° C. MMA containing CuCl/dNbpy complex and ethyl bromoisobutyrate was added to the solution. The reaction mixture was brown homogeneous all the time.

| Exp. No. | MMA, g | PLA-MM, g | p-Xylene, wt ratio to MMA | Diphenyl ether, wt ratio to MMA | M/MM/I/CuCl/dNbpy mol ratio | Temp., C. |
|---|---|---|---|---|---|---|
| HS171 | 1.38 | 1.4 | 1.38 | 2.37 | 289/11/1/1/2 | 90 |

Macromonomer: HS168, Mn = 2800
Initiator: ethyl 2-bromoisobutyrate
Ligand: 4,4'-di(n-nonyl)2,2'-bipyridine [dnNBPy]

Conditions for ATRP copolymerization of MMA and M-PLLA macromonomer

The kinetic samples, periodically taken from the reaction mixture, were diluted in THF and subjected to the GC and GPC for the estimation of the conversion of MMA and M-PLLA-macromonomer, respectively. Interestingly, the periodical sample taken at the early stage of polymerization were solidified easily at room temperature and a little hard to be dissolved in THF, while the samples at the later stage were easier to be dissolved in THF. In THF GPC, a continuous decrease of M-PLLA-macromonomer and a continuous increase of copolymer were observed. Rather surprisingly, the conversion rate of M-PLLA-macromonomer was higher than that of MMA and the reactivity ratio of MMA ($r_{MMA}$) was 0.58.

$r_{MMA}$=In([MMA]$_0$/[MMA])/In([macromonomer]$_0$/[macromonomer])

The relative reactivity of the macromonomers was evaluated by $1/r_{MMA}$=1.75. This value means that the rate constant for the reaction of the methacrylate radical at the growing chain with M-PLLA is 1.75 times higher than that with MMA.

8F. Conventional Radical Polymerization of M-PLLA-Macromonomer with MMA

In the above example the copolymerization of MMA with M-PLLA-macromonomer resulted in the faster incorporation of MM than MMA into copolymer, which is rather unusual in the copolymerization of macromonomers with low molecular weight comonomers. For a comparison, a conventional radical copolymerization of M-PLLA-macromonomer with MMA using benzoyl peroxide as a initiator under the same conditions.

TABLE 9

Conventional radical polymerization of
M-PLLA-macromonomer with MMA

| Exp. No. | MMA, g | M-PLLA-MM, g | p-Xylene, g | Diphenyl ether, g | M/MM/I mol ratio | Temp., C. |
|---|---|---|---|---|---|---|
| HS175 | 1.38 | 1.4 | 1.38 | 2.37 | 289/11/1 | 90 |

Macromonomer: HS168, Mn = 2800
Initiator: benzoyl peroxide. $k_d$ at 90 C.: $1.0 - 1.9*10^{-4}$.

Examination of the kinetics and Jaacks plot showed that MMA and M-PLLA-macromonomer were incorporated into copolymer at a similar rate. The reactivity ratio of MMA ($r_{MMA}$) was 1.09. The molecular weight changes showed a typical behavior of the conventional radical polymerization. Jose L. Eguiburu, Jose F-Berridi, Julio S. Roman, *Polymer* 1996, 37(16), 3615; reported the free radical polymerization of M-PLLA-macromonomer ($M_n$=4500) with MMA and MA using AIBN as the initiator in dioxane at 60° C. They found $r_{MMA}$=0.01±0.17 for the copolymerization of MMA with M-PLLA-macromonomer, and $r_{MMA}$=0.85±0.01 for the copolymerization of MMA with 2-acetoxyethyl methacrylate (a low molecular weight homologue of the M-PLLA-macromonomer). In the article they assumed that the reactivity ratio of the macromonomer was similar to that of the model compound and that both polymers are miscible. We believe that the difference between the two values is meaningful. Even if we can ignore any incompatibility effect on the macromonomer reactivity, there still exist the diffusion control effect. Therefore, we propose that the inherent reactivity of the terminal group of the macromonomer, the acylethyl methacrylate group, is higher than MMA and the overall reactivity of the macromonomer was reduced by the diffusion effect and coincidently became similar to that of MMA ($1/r_{MMA}$=1.0). In contrast to a controlled radical polymerization, in a standard free radical copolymerization the polydispersity of the resulting copolymer may be broad, (above 2.0).

8G. ATRP of M-PDLLA-Macromonomer with MMA

This is the experiment was designed to determine if the solubility of the PLA macromonomer has an influence its reactivity. Unlike M-PLLA, M-PDLLA showed good solubility in various solvents and was soluble in the reaction solvent even at room temperature. The GPC traces of the kinetic samples were similar to FIG. 2, and the conversion of the macromonomer was calculated in the same way. (The intensity ratio of PMMA to PDLLA at the same concentration was IR=1.91). The reactivity ratio $r_{MMA}$ was 0.68±0.01, which is very close to the $r_{MMA}$ in the copolymerization of M-PLLA-macromonomer and MMA ($r_{MMA}$=0.67). This gives a value for $1/r_{MMA}$=1.47; which indicates the solubility of PLA macromonomer does not significantly affect the copolymerization reactivity as long as the reaction mixture is homogeneous.

8H. Preparation of Homogeneously Branched PMMA-g-PLLA Graft Copolymer by ATRP

In the copolymerization of MMA and PLL-macromonomer, it has been revealed that methacrylate-terminated PLLA macromonomer (M-PLLA-macromonomer) was copolymerized faster than MMA whereas acrylate-terminated PLLA-macromonomer (A-PLLA-macromonomer) was copolymerized slower than MMA. We noted that the relative reactivity ($1/r_{MMA}$) of M-PLLA-macromonomer and A-PLLA-macromonomer to MMA was 1.4–1.8 and 0.6, respectively, and the multiplication of both value is coincidently close to one. Therefore we believed that if we used a 1:1 mixture of M-PLLA-macromonomer and A-PLLA-macromonomer, we could expect that M-PLLA-macromonomer will be incorporated into the copolymer at the early stage and A-PLLA-macromonomer will be incorporated at the later stage in the copolymerization and an homogeneously branched graft copolymer will be generated.

Reaction Conditions:

| Exp. No. | MMA, g | M-PDLLA-MM, g | p-Xylene, g | Diphenyl ether, g | M/MM/I/CuCl/dNbpy mol ratio | Temp., C. |
|---|---|---|---|---|---|---|
| HS191 | 1.74 | 2.11 | 1.74 | 2.99 | 289/11/1/1/2 | 90 |

Macromonomer(M-PDLLA-MM): HS177-2, $M_n$ = 3350
Initiator: ethyl 2-bromoisobutyrate
Ligand: 4,4'-di(n-nonyl)2,2'-bipyridine [dnNBPy]

TABLE 10

ATRP copolymerization of MMA with a mixture of M-PLLA/A-PLLA-macromonomer.

| Exp. No. | MMA, g | M-PLLA-MM, g | A-PLLA-MM, g | p-Xylene, g | Diphenyl ether, g | M/MM/I/CuCl/dNbpy mol ratio | Temp., C. |
|---|---|---|---|---|---|---|---|
| HS192 | 2.76 | 1.40 | 1.35 | 2.76 | 4.74 | 289/11/1/1/2 | 90 |

M-PLLA-MM: HS168, Mn = 2800, Mw/Mn = 1.16
A-PLLA-MM: HS177-3, Mn = 2690, Mw/Mn = 1.22
Initiator: ethyl 2-bromoisobutyrate
Ligand: 4,4'-di(n-nonyl)2,2'-bipyridine [dnNBPy]

This time, as expected, MMA and PLLA-macromonomer were incorporated into copolymer at a similar rate. The reactivity ratio of MMA ($r_{MMA}$) was 1.07. This means that one could get the PMMA-g-PLLA graft copolymer with not only intermolecularly but also intramolecularly homogeneous branching. The molecular weight of the resulting obtained copolymer was close to the predetermined value (Mn=60000). The polydispersity was quite low unlike the material prepared by a standard free radical copolymerization. Mw/Mn=1.15 (by GPC).

The reactivity ratios obtained in this series of examples and published in the literature are summarized in Table 11. One should not directly compare the reactivity ratios among the polymerization systems performed under different conditions (temperature, solvent, concentration) but the data can be used for relative comparison. It should be noted that the reactivity ratio of MMA for ATR copolymerization of MMA and HEMA was comparable to the value ($r_{MMA}$=0.75) reported by Fink for conventional radical copolymerization of these two monomers in bulk at 80° C. by (Fink, J. K. *Makromol. Chem.* 1981, 182, 2105–2107).

TABLE 11

Reactivity ratios for the copolymerization of MMA ($M_1$) with macromonomer comonomers ($M_2$)

| $M_2$ | Polymerization system | Solvent[h] | $[M_1]_0$ | Temp., | $r_1$[i] | $1/r_1$ |
|---|---|---|---|---|---|---|
| M-PLLA[a] | ATRP | DPE/xylene | 2 | 90 | 0.57 ± 0.02 | 1.75 |
| M-PDLLA[b] | ATRP | DPE/xylene | 2 | 90 | 0.68 ± 0.17 | 1.47 |
| HEMA[c] | ATRP | xylene | 4 | 90 | 0.67 ± 0.02 | 1.49 |
| HEMA[c] | Conventional (AIBN) | (bulk) | 9 | 80 | 0.75 | 1.33 |
| AEM[d] | Conventional (AIBN) | dioxane | 1 | 60 | 0.85 ± 0.01 | 1.18 |
| M-PLLA[e] | Conventional (AIBN) | dioxane | 1 | 60 | 1.01 ± 0.17 | 0.99 |
| M-PLLA[a] | Conventional (BPO) | DPE/xylene | 2 | 90 | 1.09 ± 0.05 | 0.91 |
| A-PLLA[f] | ATRP | DPE/xylene | 2 | 90 | 1.63 ± 0.10 | 0.61 |
| HEA[g] | ATRP | xylene | 2 | 90 | 1.57 ± 0.07 | 0.64 |

[a]Methacrylate-terminated poly(L-lactic acid) macromonomer, Mn = 2800.
[b]Methacrylate-terminated poly(D,L-lactic acid) macromonomer, Mn = 3350.
[c]2-Hydroxyethyl methacrylate.
[d]2-Acetoxyethyl methacrylate.
[e]Methacrylate-terminated poly(L-lactic acid) macromonomer, Mn = 4500.
[f]Acrylate-terminated poly(L-lactic acid) macromonomer, Mn = 2690.
[g]2-Hydroxyethyl acrylate.
[h]DPE: diphenyl ether.
[i]Determined by Jaacks method.

8I. Copolymerization of A-PLLA-Macromonomer and n-butyl acrylate Using ATRP

TABLE 12

ATRP copolymerization of n-butyl acrylate and A-PLLA- macromonomer.

| Exp. No. | n-BA g | A-PLLA-MM, g | Toluene, g | M/MM/I/CuBr/dNbpy mol ratio | Temp., C. | Time, hr | Conversion, % BA | % MM |
|---|---|---|---|---|---|---|---|---|
| HS185 | 3.53 | 2.69 | 5.3 | 289/11/1/1/2 | 90 | 7.2 | 7 | 2 |

Macromonomer(A-PLLA-MM): HS177-3, Mn = 2690
Initiator: methyl 2-bromopropionate
Ligand: 4,4'-di(n-nonyl)2,2'-bipyridine [dnNBPy]

This material is an interesting graft copolymer since the polymer has a soft segment backbone and biodegradable hard segments which have some ability of aggregation (crystallization). It may be useful as biodegradable thermoplastic elastomeric materials. This experiment was just the first attempt to make polyacrylate-g-PLLA copolymer because the poor solubility of the PLLA in toluene, a large excess of solvent was employed and that made the reaction very slow. One would recommend the use a more active catalyst system using either triamine or picolylamine as ligand.

8J. Copolymerization of A-PLLA-Macromonomer and n-butyl acrylate Using ATRP with Picolylamine as the Ligand.

TABLE 13

ATRP of n-BA.

| Exp. No. | n-BA, g(mmol) | BA/I[a]/CuBr/CuBr$_2$/Ligand[b] mol ratio | Solvent[c], g | Temp., °C. | Time, hr | Conversion[d], % | $M_n$[e] | $M_w/M_n$[e] |
|---|---|---|---|---|---|---|---|---|
| HS203-1 | 3.85(30) | 300/1/0.5/0.025/0.525 | Toluene 11.6 | 90 | 22.3 | 11.4 | 3,887 | 1.22 |
| HS203-2 | 3.85(30) | 300/1/0.5/0.025/0.525 | DMF 11.6 | 60 | 22.3 | 57.3 | 11,808 | 1.38 |

[a]Initiator: Methyl 2-bromopropionate.
[b]Ligand: N,N-Bis(2-pyridylmethyl)octylamine [BPMOA].
[c]0.4 ml of anisol was added as the internal standard.
[d]Determined by GC.
[e]Determined by GPC(THF, PS standard).

The reaction in toluene was very slow probably due to the poor solubility of catalyst. The reaction mixture was a little turbid yellow however when DMF was used as solvent the reaction mixture was clear yellow, and polymerization did occur.

9. Block Copolymers Wherein each Block Comprises a Graft Copolymer

Since some of the examples of graft-copolymers described above were prepared by ATRP they retain at the growing chain end a radically transferable atom and are therefore still active macroinitiators for further CRP (co) polymerizations. The synthesis of a second block, also comprising a graft copolymer; e.g. PMMA grafted through PDMS, was now prepared by ATRP.

9A1. (PMMA-g-PLLA)-b-(PMMA-g-PDMS)Block Copolymer

The graft-copolymer, PMMA grafted with PLLA, prepared as above, was employed as a macroinitiator for the copolymerization of MMA with a PDMS macromonomer. The targeted molecular weight for the MMA backbone of the second block is 15000 g.mol$^{-1}$ and the macromonomer PDMS had a $M_n$=3000 g.mol$^{-1}$. The amounts of each component of this reaction are summarized in the following Table 14.

TABLE 14

| Methyl methacrylate | 0.255 ml | 2.39.10$^{-3}$ mol |
| --- | --- | --- |
| Macromonomer PDMS | 0.262 g | 8.73.10$^{-5}$ mol |
| Macroinitiator PMMA/PLLA | 700 mg | ~1.6.10$^{-5}$ mol |
| CuCl | 2.5 mg | 2.52.10$^{-5}$ mol |
| d-n-bipy | 20.4 mg | 4.99.10$^{-5}$ mol |
| p-xylene | 0.7 ml | |
| Phenyl ether | 0.7 ml | |

Experimental procedure: The macroinitiator (powder) and the macromonomer (liquid) were added in a dry schlenk flask. 1 mm Hg vacuum was applied for 30 minutes to removing oxygen. Then, degassed xylene and diphenyl ether were added. The flask was heated with a heat gun until macrocomponents were dissolved. A solution of CuCl and dn-bipy in MMA was added and the mixture was heated at 90° C. After 20 hours, the reaction was stopped. The resulting polymer was dissolved in 2 ml of THF then precipitated in cold methanol, washed two times with methanol and dried under 1 mm vacuum. 590 mg of white powder was obtained.

Analysis:

THF-GPC: The average molecular weights and the polydispersity indices we obtained are summarized in Table 15.

TABLE 15

| Time | Mn (g/mol) | Ip |
| --- | --- | --- |
| 0 | 43000 | 1.12 |
| 3 | 46700 | 1.14 |
| 6 | 49500 | 1.16 |
| 20 | 55500 | 1.19 |

Molecular weight increases versus time. We have undoubtedly chain extended our first polymer block.

$^1$H-NMR: Analysis of the NMR spectra permits determination of the final composition of the polymer. The composition of the macroinitiator was 39% PMMA, 61% PLLA. The composition of the final polymer is 45% PMMA, 40% PLLA and 14% PDMS. As we have no GPC information concerning the consumption of the PDMS macromonomer, the PDMS signal of the NMR could be the remaining macromonomer. The macromonomer PDMS is soluble in hexane. So, the polymer was washed several times with hexane. After those washes, the NMR composition was nearly the same. This indicates that the PDMS macromonomer is incorporated in the polymer chains. So we have clearly extended the graft-macroinitiator with PMMA and incorporated the PDMS macromonomer forming a methyl methacrylate based block copolymer, one wherein one block is MMA grafted with PLLA and the second block is MMA grafted with PDMS.

9A2 (PMMA-g-PDLA)-b-(PMMA-g-PDMS) Block Copolymer

The macromonomer, and the first block of the block copolymer, PMMA-g-PDLA were prepared as described above. The molecular weight of the first block (macroinitiator) is 36800 g.mol$^{-1}$ (THF GPC measurement) and the molecular weight of the PDMS macromonomer is 3000 g.mol$^{-1}$ ($^1$H NMR measurement). The targeted degree of polymerization for the MMA backbone for the second block is 150. The targeted degree of polymerization for the macromonomer PDMS is 5. Therefore, the targeted molecular weight for the second block is 30000 g.mol$^{-1}$. The targeted molecular weight of the final polymer is consequently 66800 g.mol$^{-1}$. The amounts of each component of this reaction are summarized in Table 16.

TABLE 16

| | | |
|---|---|---|
| Methyl methacrylate | 304 ml | 2.85 10$^{-3}$ mol |
| Macromonomer PDMS | 285 mg | 9.50 10$^{-5}$ mol |
| Macroinitiator PMMA/PLLA | 700 mg | 1.90 10$^{-5}$ mol |
| CuCl | 4 mg | 4.04 10$^{-5}$ mol |
| d-n-bipy | 32.9 mg | 8.08 10$^{-5}$ mol |
| p-xylene | 0.7 ml | |
| Phenyl ether | 0.7 ml | |

Experimental procedure: The macroinitiator (powder) and the macromonomer (liquid) were added in a dry schlenk flask. 1 mm Hg vacuum was applied for 30 minutes for removing oxygen. Then, degassed xylene and diphenyl ether were added. The flask was heated with a heat gun until macro-components were dissolved. A solution of CuCl and diN-bipy in MMA was added and the mixture was heated at 90° C. After 32 hours, the reaction was stopped. The resulting polymer was dissolved in 2 ml of THF then precipitated in cold methanol, washed with methanol and hexanes and dried under vacuum. The average molecular weights and the polydispersities of the block copolymer were determined by THF-GPC based on PMMA standards calibration. Conversions of MMA and PDMS-MM were calculated from the area of the monomer pics.

TABLE 17

| Time (h) | Mn (g.mol$^{-1}$) | Ip | Conv. MMA | Conv. PDMS-MM |
|---|---|---|---|---|
| 0 | 36800 | 1.13 | 0% | 0% |
| 4 | 49500 | 1.20 | 49% | 13% |
| 8 | 56000 | 1.22 | 68% | 39% |
| 21 | 58900 | 1.37 | 91% | 58% |
| 32 | 61900 | 1.34 | 90% | 70% |

First-order kinetics plots ln([M]$_0$/[M]) versus time obtained for conversion of MMA and the macromonomer PDMS-MM during this experiment. All these curves are linear. The polymerization of the second block is perfectly controlled by ATRP. However, the consumption of MMA is much faster than PDMS-MM. A Jaacks plot ln([M]$_0$/[M])$_{MMA}$ versus ln([M]$_0$/[M])$_{PDMS-MM}$ for this experiment was prepared and the slope of this Jaacks plot permits calculation of the reactivity ratio $r_{MMA}$ for the copolymerization of MMA and PDMS macromonomer. We have calculated $r_{MMA}$=2.7. This value is high and proves that the incorporation of the PDMS macromonomer in the polymer chain is not regular. This behavior is mostly due to the repulsive interaction between PMMA and PDMS and results in the formation of a gradient copolymer as the second block, a copolymer wherein the grafted macromonomer is concentrated at one end of the block, the end furthest from the first block.

Figure 3:
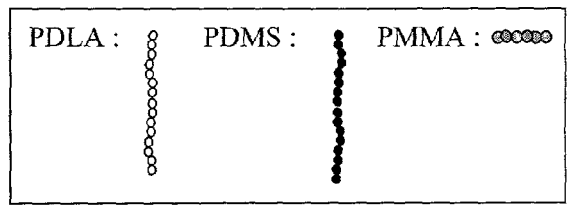
FIG. 3 is a graphical representation of examples of different structures of the block graft copolymers comprising PDLA and PDMS branches and PMMA backbone that may be produced by the process of the present invention.
Figure 3:
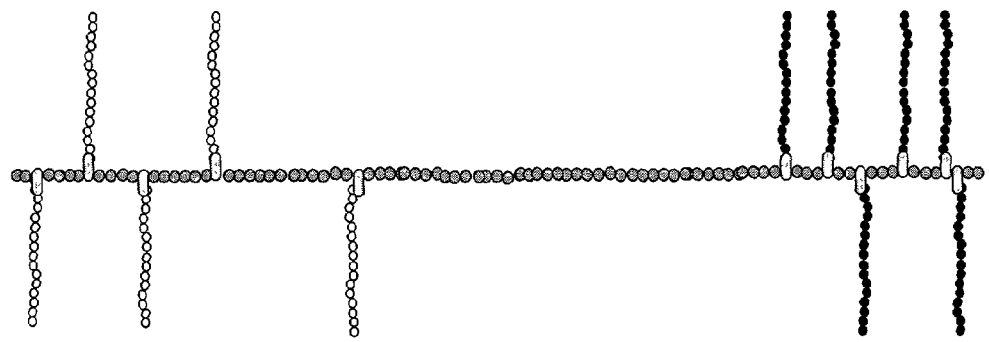
Figure 3:
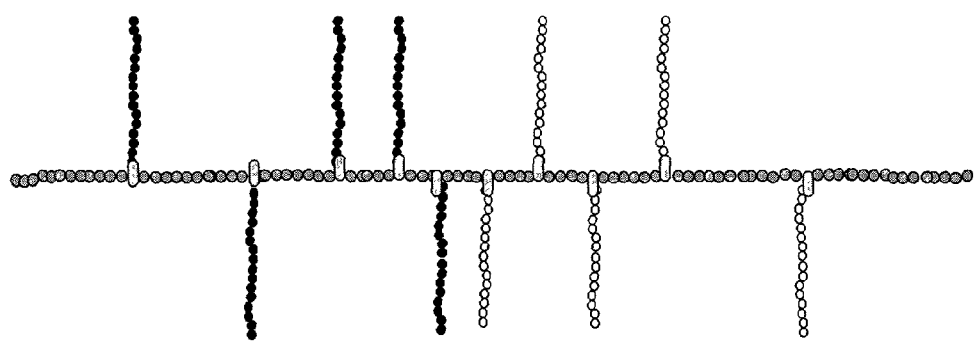

It is also possible to prepare the block copolymer starting with a PMMA-g-PDMS macroinitiator and then copolymerizing MMA and PLLA-MM. These two different block copolymers have been synthesized: JFL023 where the first synthesized block was the PMMA-grafted PDLA block and JFL028 where the first synthesized block was the PMMA-grafted PDLA block. The reactivity ratios $r_{MMA/PDLA-MM}$ and $r_{MMA/PDMS-MM}$ were calculated for both copolymers, using the Jaacks plot method. FIG. 3 shows these values and how these values impact the corresponding structures of the copolymers.

When the block PMMA-grafted PDLA is synthesized first (JFL023), the grafting segments are mostly located towards each the terminii of the backbone (upper structure shown in FIG. 3). I.e. it is almost an ABC triblock copolymer. The A block is PMMA-g-PDLA, the B block a pure PMMA segment, and the C block PMMA-g-PDMS. This results from consideration of the impact of the reactivity ratio $r_{MMA/PDLA-MM}$=0.6 in the first block, PMMA-grafted PDLA, consequently the grafted PDLA segments are mostly incorporated in the polymer chain at low MMA conversion. For the second block PMMA-grafted PDMS, due to the repulsive interaction between PMMA and PDMS, the reactivity ratio is really high $r_{MMA/PDMS-MM}$=2.7, consequently the grafted PDMS segments are mostly incorporated in the polymer chain at high MMA conversion. In conclusion, although the overall structure of the copolymer is symmetric, the distribution of the branching on the backbone is not regular with each of the graft segments concentrated at the chain ends.

When the block PMMA-grafted PDMS is synthesized first (JFL028), the distribution of the grafting segments is more regular. For the first PMMA-grafted PDMS, the reactivity ratio $r_{MMA/PDMS-MM}$=1.3. For the synthesis of the second block PMMA-grafted PDLA, there is no problem due to the repulsive effect and consequently the reactivity ratio is low $r_{MMA/PDLA-MM}$=0.5. This block copolymer more closely resembles an AB block copolymer, (PMMA-g-PDMS)-b-(PMMA-g-PDLA); as represented by the lower structure in FIG. 3.

This clearly shows that in the preparation of block copolymers wherein each block is a graft copolymer the order of synthesis of each block significantly impacts the structure or topology of the final product and the distribution of the macromonomers, or grafts, along the backbone polymer can be changed by order of block formation even when the block copolymers contain the same concentration of the same macromonomers and the block copolymer segments were prepared under the same conditions.

It is expected that with proper selection of macromonomers in such AB or ABC block-graft copolymers comprising different composition for the graft copolymer in each block the copolymer can phase separate into either a bi-phasic or a tri-phasic bulk morphology.

10. Gradient Comacromonomer Copolymers

10A: Synthesis of Abi-Graft Gradient Copolymer by ATRP

In this series of examples we will examine the effect of macromonomer end group reactivity and macromonomer composition in a copolymerization reaction involving the copolymerization of two macromonomers of different composition with a small molecular weight monomer.

The macromonomers PDLA-MM and PDMS-MM were synthesised as described above. The molecular weights of both macromonomers was 3000 g.mol$^{-1}$ ($^1$H NMR measurement). The targeted degree of polymerization of the MMA backbone is 300. The targeted degree of polymerization for each macromonomer is 5. Therefore, the targeted molecular weight of the final polymer is 60000 g.mol$^{-1}$. The amounts of each component of this reaction are summarized in Table 18.

Experimental procedure: PDLA macromonomer (powder) and PDMS macromonomer (liquid) were added to a dry schlenk flask. 1 mm Hg vacuum was applied for 30 minutes for removal of oxygen. Then, degassed xylene and diphenyl ether were added. The flask was heated with a heat gun until macromonomers were dissolved. A solution of CuCl and diN-bipy in MMA was added. Then a solution of ethyl 2-bromoisubutyrate in MMA was added and the mixture was heated at 90° C. After 21 hours, the reaction was stopped. The resulting polymer was dissolved in 2 ml of THF then precipitated in cold methanol, washed with methanol and hexanes and dried under vacuum.

TABLE 18

| | | |
|---|---|---|
| Methyl methacrylate | 1.6 g | $1.60 \cdot 10^{-2}$ mol |
| Macromonomer PDMS | 0.8 g | $2.66 \cdot 10^{-4}$ mol |
| Macromonomer PDLA | 0.8 g | $2.66 \cdot 10^{-4}$ mol |
| Ethyl 2-bromoisobutyrate | 7.8 μl | $5.33 \cdot 10^{-5}$ mol |
| CuCl | 10.6 mg | $10.66 \cdot 10^{-5}$ mol |
| d-n-bipy | 47.2 mg | $2.12 \cdot 10^{-4}$ mol |
| p-xylene | 1.5 ml | |
| Phenyl ether | 1.5 ml | |

Analysis:
  THF-GPC: The average molecular weights and the polydispersities of the dual gradient graft copolymer were determined by THF-GPC based on PMMA standards calibration. There are three different populations seen in the GPC curves, due to diphenyl ether, PDLA macromonomer and the synthesized polymer. Conversions of PDLA-MM was calculated by comparing the areas of the corresponding signal.
  Toluene-GPC: was also run and the chromatograms obtained show four different populations; due to MMA, diphenyl ether, PDMS macromonomer and the synthesized polymer. Conversion of PDMS-MM was calculated by comparing the areas of the corresponding signal.
  GC: MMA conversion was calculated by comparing the MMA pick area and the internal standard (p-xylene) pick area. The results are given in Table 19.

TABLE 19

| Time | Mn(g·mol$^{-1}$) | Ip | Conv. MMA | Conv. PDMS-MM | Conv. PDLA-MM |
|---|---|---|---|---|---|
| 1 h 30' | 28800 | 1.15 | 36% | 10% | 42% |
| 3 h 20' | 37700 | 1.14 | 50% | 30% | 56% |
| 5 h | 41500 | 1.15 | 54% | 44% | 60% |
| 7 h 30' | 45500 | 1.16 | 65% | 57% | 73% |
| 21 h | 52200 | 1.20 | — | 69% | 95% |

Figure 4:
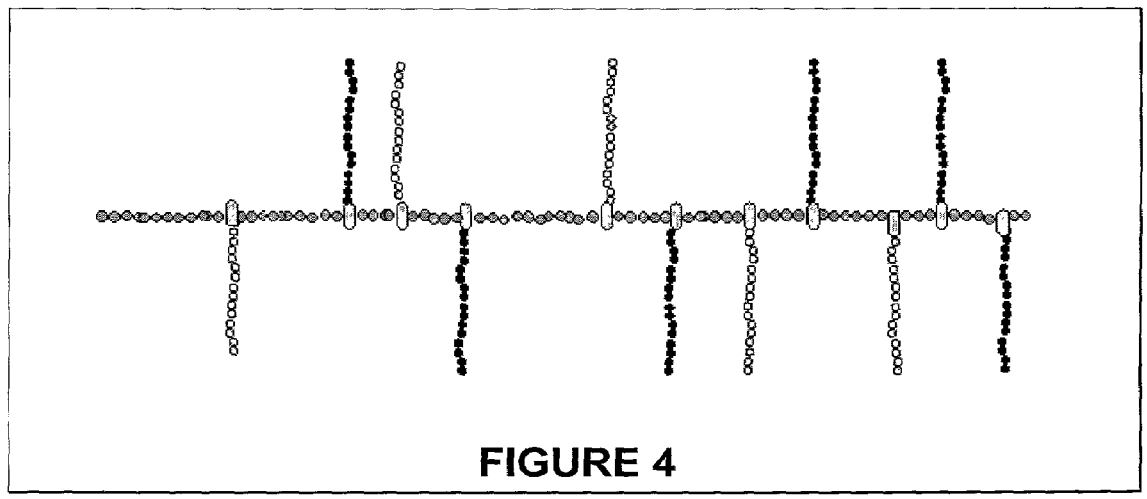
FIG. 4 is a graphical representation of an example of the structure of the synthesized gradient graft copolymer comprising a gradient in the concentration of the concentration of the two grafts along the length of the backbone.

Linear first-order kinetics plots $\ln([M]_0/[M])$ versus time were obtained for MMA, PDLA-MM and PDMS-MM during this experiment. Jaacks plots for $\ln([M]_0/[M])_{MMA}$ versus $\ln([M]_0/[M])_{PDLA-MM}$ and $\ln([M]_0/[M])_{MMA}$ versus $\ln([M]_0/[M])_{PDMS-MM}$ were prepared and the slopes of these Jaacks plots permits to calculate the reactivity ratios $r_{MMA/PDMS-MM}=1.4$ and $r_{MMA/PDLA-MM}=0.8$. These values prove that the synthesized copolymer is a gradient copolymer of both macromonomers. A graphical representation of the calculated structure of the dual macromonomer gradient graft copolymer is shown in FIG. 4.

A second experiment was run, JFL031 where the gradient copolymer is initiated by a PDMS-Br (Mn~8000 g.mol$^{-1}$) macroinitiator and it was determined that when the gradient copolymer is initiated by such macroinitiator, the reactivity ratios were: $r_{MMA/PDLA-MM}=0.9$ and $r_{MMA/PDMS-MM}=1.75$. This is not significantly different than when the small molecule initiator was used.

This result was initially unexpected but could be a further indicator of the necessity to consider the instantaneous composition of the growing backbone chain when envisioning which macromonomer will be preferentially incorporated into the copolymer. The use of a PDMS macroinitiator has a significant effect in compatibilizing a low molecular weight growing MMA polymer chain with the PDMS macromonomer but this effect is essentially cancelled when a PDLA macromonomer is incorporated into the chain. One would expect that if the second co-macromonomer also had a high reactivity ratio with MMA then preferential incorporation of the macromonomer with a compatible macroinitiator would be seen.

10B: Synthesis of a Gradient Copolymer by ATRP Using a Hybrid Catalyst

One concern with ATRP is removal of the catalyst from the final product and we have developed a hybrid catalyst system for the process; U.S. patent application Ser. No. 09/872,056, that significantly reduces the concentration of the transition metal in the final polymeric material. Residual transition metal is of particular concern when a multi-component system is being formed since one of the components could selectively interact with the transition metal to form a colored product.

Grafting Through Copolymerization Conditions:

PLA macromonomer (5 eq.), PDMS macromonomer (5 eq.), p-xylene and phenyl ether were added in a dry schlenk flask. The mixture was thoroughly purged by nitrogen flushing then heated in order to obtain a perfect solubilization of the crystalline PLA macromonomer. Then, a dispersion of (CuBr/PS-dMBpy) (2 eq.) in methyl methacrylate (250 eq.) was added into the schlenk flask. A solution of (CuBr$_2$(Me$_6$TREN)) (0.01 eq.) in acetone was added via a degassed syringe. Finally, a solution of ethyl 2-bromoisobutyrate (1 eq.) in methyl methacrylate (50 eq.) was added. The mixture was thermostated at 90° C. and samples were withdrawn through a degassed syringe at timed intervals.

Analysis conditions: The average molecular weights and the polydispersities of the graft copolymer were determined by THF-GPC based on PMMA standards calibration. PLA macromonomer conversion was calculated by THF-GPC by comparing the macromonomer pick area to the pick area of the diphenyl ether standard. PDMS macromonomer conversion was calculated by toluene-GPC by comparing the macromonomer pick area to the pick area of the diphenyl ether standard. PLA macromonomer conversion was calculated by GC by comparing the monomer pick area to the pick area of diphenyl ether and p-xylene.

Results and discussion: An examination of the first-order kinetics plots $\ln([M]_0/[M])$ versus time obtained for MMA, PDLA-MM and PDMS-MM during the copolymerization experiment showed that the kinetics of copolymerization is the same as that obtained with a homogeneous catalyst system; i.e. regardless of the catalyst system a controlled polymerization occurred. In the presence of the hybrid catalyst, the control of molecular weight is as good as in the presence of the homogeneous catalyst. However, polydispersity is slightly broader in the case of hybrid catalyst. These results prove that the hybrid catalyst system (CuBr/PS-dMBpy)/(CuBr$_2$(Me$_6$TREN)) allows one to control the synthesis of well-defined graft copolymer as efficiently as the classic homogeneous system (CuBr (d-n-Bipy)$_2$).

10C: Synthesis of a Gradient Copolymer by RAFT:

A gradient copolymer was synthesized by RAFT. The amounts of each component of this reaction are summarized in Table 20.

TABLE 20

| Methyl methacrylate | 1.2 g | 0,012 mol |
|---|---|---|
| Macromonomer PDMS | 0.6 g | 2 10$^{-4}$ mol |
| Macromonomer PDLA | 0.6 g | 2 10$^{-4}$ mol |
| Cumyl dithio benzoate | 10.9 mg | 4 10$^{-5}$ mol |
| Benzoyl peroxide | 2.6 mg | 1 10$^{-5}$ mol |
| p-xylene | 1.2 ml | |
| Phenyl ether | 1.2 ml | |

Experimental procedure: The macromonomers were added in a dry schlenk flask. 1 mm Hg vacuum was applied for 30 minutes for removing oxygen. Then, degassed xylene and diphenyl ether were added. The flask was heated with a heat gun until macrocomponents were dissolved. A solution of cumyl dithio benzoate and benzoyl peroxide in MMA was added and the mixture was heated at 75° C. After 80 hours, the reaction was stopped. The obtained polymer was dissolved in 2 ml of THF then precipitated in cold methanol, washed with methanol and hexanes and dried under vacuum. Table 21 shows the experimental results obtained for this experiment. The polymerization is extremely slow and, even after 3 days of reaction, the conversion of all monomers is still incomplete. Experimental molecular weights are higher than expected but increase slowly with conversion. These results indicate that it is difficult, but still possible to achieve such complex bi-graft gradient structures by RAFT polymerization.

TABLE 21

| Time | Mn(g · mol$^{-1}$) | Ip | Conv. MMA | Conv. PDMS-MM | Conv. PDLA-MM |
|---|---|---|---|---|---|
| 6 h | 21500 | 1.09 | 15% | 0% | 0% |
| 21 h | 49600 | 1.14 | 50% | 24% | 36% |
| 30 h | 51400 | 1.14 | — | 24% | 36% |
| 46 h | 51500 | 1.18 | 60% | 24% | 42% |
| 54 h | 56600 | 1.25 | 60% | 24% | 55% |
| 80 h | 56000 | 1.24 | 60% | 37% | — |

11. PMMA-b-Polypropylene and PMMA-g-Polypropylene Copolymer

Two approaches were taken for the preparation of a polypropylene based macroinitiator for the ATRP copolymerization of a polypropylene macromonomer with methyl methacrylate. The first was the hydrosilation of a vinyl terminated polypropylene with chlorodimethyl silane followed by reduction of the Si—Cl bond to Si—H using LiAlH$_4$ and further reaction with allyl-2-bromoisobutyrate to form the macroinitiator. The second route is in many ways the reverse approach with the first step involving the reaction of allyl-2-bromoisobutyrate with tetramethyldisiloxane and subsequent reaction with the vinyl terminated polypropylene.

11A. Synthesis of a Polypropylene Macroinitiator (Route 1).

11A1. Hydrosilation of the Unsaturated Chain End of PP

Concentration ratio: olefin:silane:catalyst:ligand=1:2:0.005:0.01.

A 50 mL three-neck round bottom flask, previously dried in the oven for 3 h, was backfilled with nitrogen and charged with 806 mg (0.005 mmol) of methylnaphtoquinone. The Karstedt's catalyst in xylene solution (0.096 mol/L, 26 mL, 0.0025 mmol) was then added at once, leading to a gold homogeneous solution. 1.5 g (0.5 mmol) of vinyl-terminated polypropylene was dissolved into 3 mL of xylene and added under nitrogen to the previous mixture. Then, 110 mL (1 mmol) of chlorodimethylsilane was added dropwise and an initial sample was removed. The yellow transparent solution was stirred at 20° C. for 2 h, then at 35° C. for 12 h. Samples were removed after 30 min and 2 h of reaction at 20° C. and after 12 h at 35° C. The disappearance of the vinylic protons signal, from 6 to 5.8 ppm and from 5.1 to 5 ppm, was clearly observed by $^1$H NMR after 12 h at 35° C., indicating that the hydrosilation reaction was successful.

11A2. Reduction of the Silicon-Chloride Bond

The excess of chlorodimethylsilane was evaporated from the previous mixture under reduced pressure for 30 min. Then this mixture was added dropwise to a solution of AlLiH$_4$ (40 mg; 1 mmol) in 10 mL of anhydrous ether, under nitrogen. The reaction mixture was stirred at 50° C. under reflux for 12 h.

11A3. Hydrosilation of allyl-2-bromoisobutyrate by Si—H Terminated PP

Concentration ratio: olefin:silane:catalyst:ligand=5:1:0.025:0.05.

The reaction was conducted in xylene. 300 mg of silane-terminated PP (0.1 mmol) was dissolved into 3 mL of xylene, and placed into a 25 mL three-neck round bottom flask under nitrogen. 1.04 mg (6 mmol) of methylnaphtoquinone was then added, followed by 31.1 mL (0.096 mol/L; 3 mmol) of Karstedt's catalyst in xylene. Then, 104 mg (0.5 mmol) of allyl-2-bromoisobutyrate was added at once. An initial sample was removed and the mixture was stirred under nitrogen at 30° C. for 12 h, then at 50° C. for 8 h and finally at 80° C. for 30 h. Aliquots were removed after 2 h and 12 h at 30° C., 8 h at 50° C. and 30 h at 80° C. The polymer was precipitated into 100 mL of methanol at −15° C. for 12 h.

The $^1$H NMR spectra revealed the absence of the expected triplet at 4.15 ppm, assigned to the methylene group linked to the oxygen. This fact seems to indicate that either this hydrosilation step or the previous reduction step was unsuccessful.

11A5. Synthesis of allyl-2-bromoisobutyrate

A 2 L three-neck round bottom flask, previously dried in the oven for 2 hours, was charged with 145.5 mL (1.176 mol) of 2-bromoisobutyrylbromide in 1200 mL of anhydrous ether, under nitrogen. The flask was put into an ice bath and a mixture of triethylamine (204.9 mL; 1.47 mol) and allyl alcohol (40 mL; 0.588 mol) was added dropwise, under nitrogen. The white heterogeneous mixture was constantly stirred under nitrogen with a mechanical stirrer for 7 h at 0° C. The mixture was then filtered twice and the liquid phase was quenched with 600 mL of distilled water. The ether phase was washed four times with 250 mL portions of aqueous NaOH (5%), twice with 250 mL portions of aqueous HCl (5%), and twice more with 250 mL portions of distilled water. The solution was then dried over magnesium sulfate for 1 hour and magnesium sulfate was filtered off. Ether was evaporated under reduced pressure and the product was distilled under vacuum (bp=65° C. under 5 mmHg) to afford 84 g of a colorless liquid (yield 69%). The purity of the final product was totally confirmed by IR, but only partially by $^1$H NMR. So it has to be further established by $^{13}$C NMR.

11B. Synthesis of a Polypropylene Macroinitiator (Route2).

11B1. Hydrosilation of ally-2-bromoisobutyrate by Tetramethyldisiloxane

Concentration ratio: olefin:silane catalyst:ligand=1:14:0.02:0.04

The reaction was conducted in bulk. A 250 mL three-neck round bottom flask was backfilled with nitrogen and charged with tetramethyldisiloxane (100 mL; 565.8 mmol) and allyl-2-bromoisobutyrate (8.316 g; 40 mmol). The flask was then put into an ice bath and a mixture of Karstedt's catalyst (0.096 mol/L; 8.32 mL; 0.8 mmol) and methylnaphtoquinone (0.274 g; 1.6 mmol) in xylene solution was then added dropwise, leading to a gold homogeneous solution. The mixture was stirred under nitrogen at 20° C. for 2 h, then at 50° C. for 16 h. The excess of tetramethyldisiloxane was evaporated at 50° C. under reduced pressure (50 mmHg then 5 mmHg).

Aliquots were removed after 30, 60 and 120 minutes of reaction at room temperature and after 2 h and 16 h at 50° C.

$^1$H NMR spectra show that the reaction was fully completed after 2 hours at 50° C.

11B2. Hydrosilation of Vinyl-Terminated Polypropylene with Unpurified 11B1

Concentration ratio: vinyl-terminated PP:silane:catalyst:ligand=1:5:0.02:0.04. A 50 mL three-neck round bottom flask was backfilled with nitrogen and charged with vinyl-terminated polypropylene (1.5 g; 0.5 mmol). The polymer was dissolved into 3 mL of xylene and tetramethyldisiloxanepropyl-2-bromoisobutyrate (7.71 g; purity ~50%; ~2.5 mmol. A mixture of Karstedt's catalyst (0.096 mol/L; 104.16 mL; 0.01 mmol) and methylnaphtoquinone (3.45 mg; 0.02 mmol) in xylene solution was then added dropwise, leading to an orange homogeneous solution. An initial sample was removed, and the mixture was stirred under nitrogen at 20° C. for 1 h, then at 50° C. for 2 h. Aliquots were removed after 30 and 60 minutes of reaction at room temperature and after 2 h at 50° C.

The polymer was precipitated into 50 mL C, re-dissolved into 10 mL of anhydrous ether and filtrated through a 0.2-mm filtration membrane. Ether was evaporated under reduced pressure and a sample was removed for analysis. The polymer was dissolved again in 10 mL of anhydrous ether and precipitated into 100 mL of methanol. The solvents were then evaporated under low ($10^{-2}$ mmHg) to high vacuum ($10^{-7}$ mmHg) for 2 h and 4 h respectively. Another sample was removed for analysis. The disappearance of the vinylic protons signal, from 6 to 5.8 ppm and from 5.1 to 5 ppm, was clearly observed by $^1$H NMR after 2 h at 50° C., indicating that the hydrosilation reaction was successful. In addition, the triplet at 4.15 ppm, assigned to the methylene group linked to the oxygen of the ester, can still be observed after all the purification steps. However, the integrations in the 1–0 ppm region are still higher than expected, indicating that the polymer blend still contain some side products, possibly attached to the polypropylene.

Elemental analysis indicates a content of bromine equal to 1.94% (2.6% expected, assuming that the molecular weight of the polypropylene is around 3000 g/mol).

ATRP can thus be carried out with this macro-initiator

11B3. ATRP of MMA Using Polypropylene-Based Macro-Initiator (Preparation of a Block Copolymer)

Concentration ratios: monomer:macro-initiator:catalyst:ligand=100:1:1:1

The polymerization was conducted in xylene (solvent:monomer=1:1). The quantity of macro-initiator in the polypropylene blend was assessed from the content of bromine found by elemental analysis (1.94%). The polypropylene-based macro-initiator (11B2—0.46 g; 1.94% of Br; 0.112 mmol) in 1.2 mL of xylene and 1.195 mL (11.2 mmol) of MMA were placed into a sealed Schlenk flask and were cleaned of oxygen by a bubbling of nitrogen for 30 min. The mixture was frozen into a liquid nitrogen bath and the Schlenk flask was degassed and backfilled with liquid nitrogen. Then, copper(I) chloride (11.06 mg; 0.112 mmol) and dNBipy (45.66 mg; 0.112 mmol) were added to the frozen mixture and the flask was degassed and backfilled with liquid nitrogen 3 times. The liquid nitrogen bath was removed and the mixture was stirred, as it became a dark red liquid. An initial sample was removed and the mixture was stirred at 90° C. for 6 h. Aliquots removed during the polymerization after 30 min, 1 h, 2 h, 4 h and 6 h of reaction. The dark viscous mixture obtained was dissolved into 10 mL of THF and precipitated into 100 mL of a MeOH/H$_2$O solution (80/20) for 12 h at 0° C. The mixture was then filtrated, leaving a white powder that was dried under reduced pressure for 4 h.

A nice shift toward the high molecular weight was observed, as well as the progressive disappearance of the PP-based macro-initiator. Final conversion can be assessed from the NMR spectrum of the purified polymer blend. Final monomer conversion value is 61%, which lead to a macro-initiator efficiency of 32%. Moreover, the polydispersity index, obtained by cutting the tail of the GPC trace coming from the unreacted macro-initiator, is below 1.1.

In these examples it is believed that the first step involving tetramethyldisiloxane and allyl-2-bromoisobutyrate leads to the desired product with a significant amount of side products. In addition, the second step affords only partially functionalized polypropylene. Hence, first step was performed again, at a lower temperature. In addition, evaporation of the excess of tetramethyldisiloxane was conducted while the product was still under nitrogen (rather than transferring the mixture into a round-bottom flak to use the rotavapor) and at room temperature, as formation of Si—O—Si based products can be observed with Karstedt's catalyst in the presence of water; Britcherm L. G., Kehoe, D. C.; Matisons, J. G., Swinser, A. G. "Siloxane Coupling Agents" *Macromolecules* 1995, 28, 3110–3118. Furthermore, a much longer reaction time was allowed for the second step, in order to try to increase the degree of functionality of the polypropylene.

11B4: Hydrosilation of ally-2-bromoisobutyrate by Tetramethyldisiloxane

Concentration ratio: olefin:silane:catalyst:ligand=1:10:0.02:0.04

The reaction was conducted in bulk. A 100 mL three-neck round bottom flask, previously dried in the oven for 2 h, was backfilled with nitrogen and charged with tetramethyldisiloxane (42.7 mL; 241.5 mmol) and allyl-2-bromoisobutyrate (5 g; 24.15 mmol). The flask was then put into an ice bath and a mixture of Karstedt's catalyst (0.096 mol/L; 5.03 mL; 0.483 mmol) and methylnaphtoquinone (0.266 g; 0.966 mmol) in xylene was then added dropwise, leading to a gold homogeneous solution. The mixture was stirred under nitrogen at 30° C. for 2 h, then at 50° C. for 40 h. The excess of tetramethyldisiloxane and the possible residual allyl-2-bromoisobutyrate were evaporated under reduced pressure (5 mmHg) and high vacuum ($10^{-7}$ mmHg). Aliquots were removed after 1 h and 2 h of reaction 30° C. and after 2, 16 and 40 h at 50° C. $^1$H NMR spectra show the complete disappearance of the allylic proton signals of the allyl-2-bromoisobutyrate between 6 and 5.85 ppm and between 5.5 and 5.2 ppm after 40 h, indicating that the reaction isn't completed until this rather long time. In addition, the triplet at 4.15 ppm assigned to the methylene group linked to the oxygen of the ester can clearly be observed, with an integration consistent with those of the Si—H and of the 2 $CH_3$ attached to the C—Br. However, the integrations in the 0.5–0 ppm region are still higher than expected, indicating that a significant amount of side-products is obtained again.

11B5. Hydrosilation of Vinyl-Terminated Polypropylene with Unpurified 11B4

Concentration ratio: vinyl-terminated PP:silane:catalyst:ligand=1:5:0.02:0.04

The reaction was conducted in xylene. A 50 mL three-neck round bottom flask was backfilled with nitrogen and charged with vinyl-terminated polypropylene (1.5 g; 0.5 mmol). The polymer was dissolved into 3 mL of xylene and tetramethyldisiloxanepropyl-2-bromoisobutyrate (1.71 g; purity ~50%; ~2.5 mmol. A mixture of Karstedt's catalyst (0.096 mol/L; 104.16 mL; 0.01 mmol) and methylnaphtoquinone (3.45 mg; 0.02 mmol) in xylene solution was then added dropwise, leading to an orange homogeneous solution. An initial sample was removed, and the mixture was stirred under nitrogen at 50° C. for 24 h. Aliquots were removed after 2 h and 24 h at 50° C. The polymer was precipitated into 50 mL of methanol, re-dissolved into 10 mL of anhydrous ether and filtrated through a 0.2-mm filtration membrane. It was then precipitated into 100 mL of methanol. The solvents were then evaporated under low ($10^{-2}$ mmHg) and high vacuum ($10^{-7}$ mmHg). A sample was removed for elemental analysis and NMR. The disappearance of the vinylic protons signal, from 6 to 5.8 ppm and from 5.1 to 5 ppm, was clearly observed by $^1$H NMR after 2 h at 50° C., indicating that the hydrosilation reaction was successful. In addition, the triplet at 4.15 ppm, assigned to the methylene group linked to the oxygen of the ester, can still be observed after all the purification steps. However, the integrations in the 0.5–0 ppm region are still higher than expected, indicating that the polymer blend still contain some side products, possibly attached to the polypropylene.

11C. Variation of Second Route. (Scheme 7)

11C1. Hydrosilation of Vinyl Terminated Polypropylene with Tetramethyldisiloxane.

Concentration ratio: vinyl-terminated PP:silane catalyst:ligand=1:5:0.02:0.04

A 25 mL three-neck round bottom flask, previously dried in the oven for 3 h, was backfilled with nitrogen and charged with 2.07 mg (12 mmol) of methylnaphtoquinone. The Karstedt's catalyst in xylene solution (0.096 mol/L, 62.5 mL, 6 mmol) was then added at once, leading to a gold homogeneous solution. 1.23 g (0.3 mmol) of vinyl-terminated polypropylene was dissolved into 2.5 mL of xylene and added under nitrogen to the previous mixture. Then, 265.2 mL (1.5 mmol) of tetramethyldisiloxane was added at once and an initial sample was removed. The yellow transparent solution was stirred at 35° C. for 2 h. Aliquots were removed after 1 and 2 h of reaction. The disappearance of the vinylic protons signal, from 6 to 5.8 ppm and from 5.1 to 5 ppm, was clearly observed by $^1$H NMR, indicating that the hydrosilation reaction was successful. The absence of coupling between two PP chains was confirmed by GPC.

11C2. Hydrosilation of allyl-2-bromoisobutyrate (AbiB) with the Previous Functionalized Polypropylene.

Concentration ratio: silane-terminated PP:ABiB:catalyst:ligand=1:5:0.02:0.04

The excess of tetramethyldisiloxane was evaporated under reduced pressure from the previous mixture (JS 1/19) for 1h. A mixture of Karstedt's catalyst in xylene (6 mmol; 65.5 mL) and methylnaphtoquinone (12 mmol; 2.07 mg) was then added, followed by 311.8 mg (1.5 mmol) of allyl-2-bromoisobutyrate. An initial sample was removed and the mixture was stirred at 50° C. for 12 h. The polymer was precipitated into 100 mL, re-dissolved into 10 mL of anhydrous ether and filtrated through a 0.2-mm filtration membrane. Ether was evaporated under reduced pressure and a sample was removed for analysis. The polymer was dissolved again in 10 mL of anhydrous ether and precipitated into 200 mL of methanol. The solvents and the possible excess of allyl-2-bromoisobutyrate were then evaporated under high vacuum ($10^{-7}$ mmHg) for 5 h. Another sample was removed for analysis. Evidence for efficiency of the reaction is brought by observing the triplet at 4.15 ppm, assigned to the methylene group linked to the oxygen of the ester. However, efficiency of the reaction cannot be assessed by NMR, due to the weakness of the aforementioned signal. Thus, further ATRP will be based again on the content of bromine found by elemental analysis.

11C3. ATRP of MMA Using Polypropylene-Based Macroinitiator

The quantity of macro-initiator in the polypropylene blend was assessed from the content of bromine found by elemental analysis (1.16%) and this was used to calculate the concentration ratios: monomer:macro-initiator:catalyst:ligand=100:1:1:1. The polypropylene-based macro-initiator (JS 1/20—0.671 g; 1.16% of Br; 97.4 mmol) in 2.1 mL of xylene, 1.042 mL (9.74 mmol) of MMA and 45.5 mL of diphenylether (internal standard, 5% wt/monomer) were placed into a sealed Schlenk flask and were cleaned of oxygen by a bubbling of nitrogen for 30 min. The mixture was frozen into a liquid nitrogen bath and the Schlenk flask was degassed and backfilled with liquid nitrogen. Then, copper(I) chloride (9.64 mg; 97.4 mmol) and dNBipy (39.82 mg: 97.4 mmol) were added to the frozen mixture and the flask was degassed and backfilled with liquid nitrogen 3 times. The liquid nitrogen bath was removed and the mixture was stirred, as it became a dark red liquid. An initial sample was removed and the mixture was stirred at 90° C. for 30 h. Aliquots removed during the polymerization after 30 min, 1 h, 2 h, 4 h, 6 h, 8 h, 20 h and 30 h of reaction. The dark viscous mixture obtained was dissolved into 5 mL of THF and precipitated into 100 mL of MeOH for 12 h at −15° C. The mixture was then filtrated, leaving a white powder that was dried under high vacuum ($10^{-7}$ mmHg) for 4 h. A nice shift toward the high molecular weights was observed, as well as the progressive disappearance of the PP-based macro-initiator. However, the final molecular weight of the copolymer was significantly higher than expected (27,000 g/mol rather than 15,000 g/mol expected. This indicates either a very slow initiation process or poor macro-initiator efficiency which can be attributed to the lower degree of functionality of the starting polypropylene (1.16% bromine versus 1.94% previously). Thanks to a much better homogeneity of the mixture, the final monomer conversion obtained is significantly higher, around 80% (61% previously).

13. ATRP of MMA Using Macroinitiator and Ionic Liquids.

In all experiments describing the polymerization of MMA in ionic liquids using low molecular weight alkyl halide (EBiB) as initiator; co-pending U.S. Application No. 60/238,809, low initiation efficiencies were observed. Higher initiation efficiencies were observed when the ionic liquid was used in catalytic amounts. The concentration of radicals in ATRP equilibrium is determined by the concentration of the transition metal halides and alkyl halides. The ionic liquids are highly solvating, yet non-coordinating solvents. It is plausible that the concentration of catalyst (both activator and deactivator) is low in organic phase where polymerization occurs but very high in ionic liquid phase. Thus, when low molecular weight initiator enters ionic liquid phase, it encounters very high catalyst concentration (~1 mole), which results in the generation of very high concentration of radicals leading to termination, i.e. low initiation efficiency. However, this short non-stationary state is over when higher molecular weight oligomers are formed which cannot enter ionic liquid phase. Then well-controlled polymerization occurs with linear evolution of molecular weight with conversion. The entire molecular weight distribution shifts to higher masses and polymers with relatively low polydispersities are obtained. If a macroinitiator is used instead of ethyl 2-bromoisobutyrate, it should stay in the organic phase and the ATRP process should be determined only by the migration of the catalyst to this phase.

In order to verify this scenario, macroinitiators were used (PMMA-Br with $M_n=1500$) in the ATRP of MMA with 1-butyl-3-methylimidazolium bromide-FeBr$_2$, in the presence of Fe$^{III}$. The GPC traces of polymer samples taken at intervals throughout the polymerization show an initial bimodal molecular weight distribution with progressively and continuously occurring initiation as the macroinitiator signal is converted to higher molecular weight polymer. The first-order kinetic plots were linear, showing a constant concentration of radicals throughout the reaction. The reaction rates depend strongly on the amount of the deactivator in the ionic liquid phase. Thus, when the concentration of FeII was increased from 0.7 to 0.9 mole vs. initiator, the apparent polymerization rate constant increased from $k^{app} \approx 5.1*10^{-6}$ s$^{-1}$ to $\approx 2*10^{-5}$ s$^{-1}$. Total molecular weight follows closely the theoretical values, while initiation efficiency was high. When only the high molecular weight fraction of the polymer is analyzed, the initiation efficiency continuously increases. It is possible to determine the rate of disappearance of the macroinitiator in this system, by analyzing number distribution of polymer chains (RI signal divided by molecular weight). [K. Matyjaszewski; D. A. Shipp; G. P. McMurtry; S. G. Gaynor; T. Pakula *J. Polym. Sci., Part A: Polym. Chem.* 38, 2023 (2000).] It appears that half of the macroinitiator is consumed after 5 hours and 90% after 15 hours. Relatively slow consumption of the macroinitiator is probably due to low concentration of the activator in the organic phase. The number of polymer chains vary linearly in time, but the increase in rate is much larger than it would be expected for a small increase of catalyst concentration. This observation suggests that not only the activation step but also deactivation, and thus the concentration of metal in higher oxidation state in the organic phase, determine the ATRP equilibrium when ionic liquids are used. At high degree of polymerization the ATRP equilibrium is altered not only because of an increase in viscosity, but because the diffusion of the catalyst, solvated by the ionic liquid, into the organic phase is decreased. ATRP in ionic liquids proceeds with low initiation efficiency. This can be ascribed to relatively low concentration of the catalyst in organic medium and very high concentration of catalyst in ionic liquid phase. When low molecular weight initiator enters ionic liquid phase, it generates large concentration of radicals, which terminate and result in low initiator efficiency. However, after this short non-stationary state, polymerization is controlled and molecular weights evolve linearly with conversion, resulting in polymers with low polydispersities. The initiation efficiency can be significantly increased in the presence of macroinitiators, which cannot enter ionic liquid phase.

It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, those of ordinary skill in the art will, upon considering the foregoing description, recognize that many modifications and variations of the invention may be employed. All such variations and modifications of the invention are intended to be covered by the foregoing description and the following claims.

The invention claimed is:

1. A polymerization process, comprising:
   selecting (co)polymerizable monomers and macromonomers for copolymerization, wherein the relative reactivity ratio of the monomer and the macromonomer determines the rate of incorporation of the monomer and macromonomer into a graft (co)polymer; and
   polymerizing the (co)polymerizable monomers and the macromonomers with a compatible macroinitiator to form the graft (co)polymer.

2. The process of claim 1, wherein the polymerization process is a radical polymerization process.

3. The process of claim 1, wherein the polymerization process is a controlled polymerization process.

4. The process of claim 3, wherein the polymerization process is a controlled radical polymerization process.

5. The process of claim 3, wherein the polymerization process is a controlled addition polymerization process.

6. The polymerization process of claim 1, wherein the (co)polymerizable monomers and macromonomers are radically copolymerizable.

7. The polymerization process of claim 1, wherein the macromonomer comprises silicon.

8. The polymerization process of claim 1, wherein the macromonomer comprises a biocompatible monomer unit.

9. The polymerization process of claim 1, wherein the macromonomer is a polyolefin.

10. The polymerization process of claim 1, wherein the (co)polymerizable monomers are small molecule monomers.

11. The polymerization process of claim 1, further comprising forming a gradient graft copolymer.

12. The polymerization process of claim 1, further comprising:
polymerizing a second copolymerizable macromonomer comprising reactive terminal functionality different than the reactive functionality on the copolymerizable macromonomer.

13. The polymerization process of claim 1, further comprising:
forming a graft copolymer with a homogeneous distribution of grafts.

14. The polymerization process of claim 1, wherein the relative reactivity ratio is within the range of 0.5 to 1.5.

15. The polymerization process of claim 12, wherein the macromonomers and second copolymerizable macromonomers comprise different monomer units.

16. The process of claim 15, further comprising:
forming a gradient copolymer.

17. The process of claim 13, wherein the grafts comprise at least one lactic acid unit and the molecular weight distribution of the backbone is less than 2.

18. The process of claim 15, wherein the macroinitiator comprises a gradient or a block copolymer segment.

19. A polymerization process, comprising:
polymerizing free radically polymerizable monomers and free radically polymerizable macromonomers with a macroinitiator, wherein the macroinitiator comprises a graft copolymer.

20. The process of claim 19, further comprising:
forming a graft copolymer comprising cross linking functional groups;
and crosslinking the copolymer to stabilize the morphology of the bulk graft copolymer.

21. A polymerization process, comprising:
polymerizing poly(lactic acid) macromonomers in a controlled polymerization process with a copolymerizable monomer to form a graft copolymer having poly(lactic acid) branches.

22. The polymerization process of claim 21, wherein the poly(lactic acid) macromonomers comprise at least one end group selected from methacryloyl and acrlyoyl.

23. The polymerization process of claim 21, wherein the poly(lactic acid) macromonomer is selected from methyl methacrylate terminated poly(L-lactic acid), methyl acrylate terminated poly(D,L-lactic acid), and acrylate terminated (L-lactic acid).

24. The polymerization process of claim 23, wherein the copolymerizable monomer is an acrylate.

25. The polymerization process of claim 24, wherein the copolymerizable monomer is at least one of acrylates, methyl acrylates, butyl acrylates, methacrylates, and methyl methacrylates.

26. The polymerization process of claim 1, wherein the macroinitiator has a different composition than the macromonomer and is soluble in the macromonomer.

27. The polymerization process of claim 1, wherein the polymerizing is conducted in one of bulk, a solvent or in a biphasic medium.

28. The polymerization process of claim 27, wherein the polymerizing is conducted using a compatible co-solvent for both the macromonomer and the copolymer.

29. The polymerization process of claim 27, wherein the polymerizing is conducted in a biphasic medium and the biphasic medium comprises an ionic liquid.

30. The process of claim 15, further comprising:
comprising forming a block copolymer.

31. The process of claim 30, wherein the block copolymer is an AB block copolymer.

32. The process of claim 30, wherein the block copolymer is an ABC block copolymer.

33. A graft copolymer, comprising:
a backbone comprising a molecular weight distribution less than 2.0 and free radically polymerizable monomer units; and
graft segments comprising at least one of a polyolefin, a poly(lactic acid) and a polysiloxane distributed along the backbone, wherein the copolymer forms one of a biphasic copolymer or a triphasic copolymer.

34. A graft copolymer, comprising:
a backbone comprising a molecular weight distribution less than 2.0 and free radically polymerizable monomer units; and
graft segments comprising at least one of a polyolefin, a poly(lactic acid) and a polysiloxane distributed along the backbone, wherein the graft copolymer has one phase with a substantially cylindrical morphology or two phases with a continuous morphology.

* * * * *

UNITED STATES PATENT AND TRADEMARK OFFICE
CERTIFICATE OF CORRECTION

PATENT NO. : 7,049,373 B2
APPLICATION NO. : 10/034908
DATED : May 23, 2006
INVENTOR(S) : Krzysztof Matyjaszewski, Jean-François Lutz and Hosei Shinoda It is certified that error appears in the above-identified patent and that said Letters Patent is hereby corrected as shown below:

Column 2, line 8, delete "process as" and insert --process. As--

Column 2, line 21, delete "and" and insert --or--

Column 5, line 9, delete "5,763,548" and insert --5,763,546--

Column 5, line 18, delete "6,642,262" and insert --6,624,262--

Column 10, lines 60-61, delete second occurrence of "to form graft copolymers"

Column 14, line 46, delete "," and insert --.--

Column 20, line 46, delete ""(co)polymer means" and insert --"(co)polymer" means--

Column 20, line 47, delete ""(co)polymerizable means" and insert
   --"(co)polymerizable"--

Column 21, line 12, delete "PMMA" and insert --pMMA--

Column 23, line 11, delete "block co-macroinitiator" and insert
   --"block co-macroinitiator"--

Column 23, line 12, delete "block co-macromonomer" and insert
   --"block co-macromonomer"--

Column 25, line 46, delete "A TRP" and insert --ATRP--

Column 26, line 19, delete "A TRP" and insert --ATRP--

Column 30, lines 44-45, insert --in a-- after the word "proceeds"

Column 31, Table 4, $4^{th}$ column, second heading row, delete "MMA.SiM" and insert
   --MMA/SiM--

Column 31, Table 4, $4^{th}$ column, line 17, delete "248" and insert --24.8--

Column 31, Table 4, $5^{th}$ column, line 10, delete "0 83" and insert --0.83--

Column 31, Table 4, $6^{th}$ column, line 20, delete "27" and insert --2.7--

Column 31, Table 4, $8^{th}$ column, line 8, delete "19 0" and insert --19.0--

Column 31, Table 4, $8^{th}$ column, line 9, delete "19 0" and insert --19.0--

UNITED STATES PATENT AND TRADEMARK OFFICE
CERTIFICATE OF CORRECTION

PATENT NO. : 7,049,373 B2
APPLICATION NO. : 10/034908
DATED : May 23, 2006
INVENTOR(S) : Krzysztof Matyjaszewski, Jean-François Lutz and Hosei Shinoda It is certified that error appears in the above-identified patent and that said Letters Patent is hereby corrected as shown below:

Column 31, Table 4, 10$^{th}$ column, line 3, delete "2 05" and insert --2.05--

Column 31, Table 4, 10$^{th}$ column, line 9, delete "2 58" and insert --2.58--

Column 31, Table 4, 10$^{th}$ column, line 12, delete "1 70" and insert --1.70--

Column 31, Table 4, 10$^{th}$ column, line 16, delete "2 14" and insert --2.14--

Column 31, Table 4, 11$^{th}$ column, line 8, delete " 0 42$^{b}$" and insert --0.42$^{b}$--

Column 31, Table 4, 11$^{th}$ column, line 9, delete "0 39" and insert --0.39--

Column 31, Table 4, 11$^{th}$ column, line 14, delete "0 65" and insert --0.65--

Column 31, Table 4, 11$^{th}$ column, line 20, delete "0 81" and insert --0.81--

Column 32, line 20, insert --with-- after the word "compatibility"

Column 33, Table 5, 3$^{rd}$ column, line 1, delete "32" and insert --3.2--

Column 33, Table 5, 3$^{rd}$ column, line 2, delete "32" and insert --3.2--

Column 33, Table 5, 3$^{rd}$ column, line 3, delete "34" and insert --3.4--

Column 51, line 22, after the word "silane" insert --:--

Column 53, line 60, delete "silane catalyst" and insert --silane:catalyst--

Column 55, line 50, delete "Fell" and insert --Fe$^{ll}$--

Signed and Sealed this

Tenth Day of February, 2009

JOHN DOLL
*Acting Director of the United States Patent and Trademark Office*